United States Patent
Zhang et al.

(10) Patent No.: US 9,781,416 B2
(45) Date of Patent: *Oct. 3, 2017

(54) NEIGHBORING BLOCK DISPARITY VECTOR DERIVATION IN 3D VIDEO CODING

(71) Applicant: QUALCOMM Incorporated, San Diego, CA (US)

(72) Inventors: Li Zhang, San Diego, CA (US); Ying Chen, San Diego, CA (US); Jewon Kang, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 398 days.

This patent is subject to a terminal disclaimer.

(21) Appl. No.: 14/189,648

(22) Filed: Feb. 25, 2014

(65) Prior Publication Data

US 2014/0241430 A1    Aug. 28, 2014

Related U.S. Application Data

(60) Provisional application No. 61/769,716, filed on Feb. 26, 2013, provisional application No. 61/770,263, filed on Feb. 27, 2013, provisional application No. 61/770,268, filed on Feb. 27, 2013, provisional application No. 61/772,321, filed on Mar. 4, 2013, provisional application No. 61/803,384, filed on Mar.

(Continued)

(51) Int. Cl.
*H04N 19/51* (2014.01)
*H04N 19/583* (2014.01)
*H04N 19/56* (2014.01)
*H04N 19/52* (2014.01)
*H04N 19/53* (2014.01)
*H04N 19/44* (2014.01)

(52) U.S. Cl.
CPC ....... *H04N 19/00733* (2013.01); *H04N 19/44* (2014.11); *H04N 19/52* (2014.11); *H04N 19/53* (2014.11); *H04N 19/56* (2014.11)

(58) Field of Classification Search
CPC .................................................. H04N 19/597
USPC .................................................... 375/240.16
See application file for complete search history.

(56) References Cited

U.S. PATENT DOCUMENTS

| | | | |
|---|---|---|---|
| 8,982,183 B2 * | 3/2015 | Jeon .................... | H04N 21/2365 348/43 |
| 9,237,345 B2 * | 1/2016 | Kang ................... | H04N 19/597 |
| 9,253,486 B2 * | 2/2016 | Tian .................... | H04N 13/0048 |

(Continued)

OTHER PUBLICATIONS

Depth-oriented Neighboring block disparity Vector (DoNBDV) with virtual depth retrieval; Chang; MediaTech; Oct. 2012.*

(Continued)

*Primary Examiner* — William C Vaughn, Jr.
*Assistant Examiner* — Luis Perez Fuentes
(74) *Attorney, Agent, or Firm* — Shumaker & Sieffert, P.A.

(57) ABSTRACT

In one example of the disclosure, a method of coding video data comprises coding video data using texture-first coding, and performing an NBDV derivation process for a block of the video data using a plurality of neighboring blocks. The NBDV derivation process comprises designating a motion vector associated with a neighboring block of the plurality of neighboring blocks coded with a block-based view synthesis prediction (BVSP) mode as an available disparity motion.

29 Claims, 10 Drawing Sheets

Related U.S. Application Data 19, 2013, provisional application No. 61/815,656, filed on Apr. 24, 2013.

(56) References Cited

U.S. PATENT DOCUMENTS

| | | | | |
|---|---|---|---|---|
| 9,264,691 | B2* | 2/2016 | Zou | H04N 19/597 |
| 9,319,657 | B2* | 4/2016 | Kang | H04N 13/0048 |
| 9,521,425 | B2* | 12/2016 | Chen | H04N 19/597 |
| 9,635,357 | B2* | 4/2017 | Zhang | H04N 19/51 |
| 2010/0266042 | A1* | 10/2010 | Koo | H04N 19/597 375/240.16 |
| 2011/0012994 | A1* | 1/2011 | Park | H04N 21/234327 348/43 |
| 2011/0293020 | A1* | 12/2011 | Lim | H04N 19/597 375/240.25 |
| 2014/0078251 | A1* | 3/2014 | Kang | H04N 13/0048 348/43 |
| 2014/0098883 | A1 | 4/2014 | Hannuksela et al. | |
| 2014/0153645 | A1* | 6/2014 | Zhang | H04N 19/597 375/240.12 |
| 2014/0240456 | A1 | 8/2014 | Kang et al. | |
| 2014/0241431 | A1* | 8/2014 | Zhang | H04N 19/56 375/240.16 |
| 2014/0267605 | A1 | 9/2014 | Thirumalai et al. | |
| 2014/0269898 | A1 | 9/2014 | Thirumalai et al. | |
| 2014/0314147 | A1 | 10/2014 | Rusanovskyy et al. | |
| 2014/0341289 | A1 | 11/2014 | Schwarz et al. | |
| 2015/0195572 | A1* | 7/2015 | Chen | H04N 19/517 375/240.16 |

OTHER PUBLICATIONS

Improvement on MV candidates for 3DVC—Mediatech—Zhang; Oct. 2012.*
Block based View synthesis prediction for 3D-ATM; Wenyi Su; Nokia; Jul. 2012.*
MVC Motion Skip Mode; Koo; LG—2007.*
CE11 MVC Motion Skip Mode; Koo; LG—2007.*
3D-AVC Test Model 4; Hannuksela; Oct. 2012.*
International Preliminary Report on Patentability from International Application No. PCT/US2014/018694, dated May 22, 2015, 13 pp.
Bang, et al., "3D-CE2.A Results on Simplification on the Disparity Vector Derivation,"JCT3V-C0122, Jan. 17-23, 2013, Joint Collaborative Team on 3D Video Coding Extension Development of ITU-T SG 16 WP 3 and ISO/IEC JTC 1/SC 29/WG 11, 3rd Meeting: Geneva, CH, Jan. 14, 2015, 5 pp.
Chang, et al., "CE1.h: Depth-Oriented Neighboring Block Disparity Vector (DoNBDV) with Virtual Depth Retrieval," Media Tek Inc., JCT3V-C0131, 3rd Meeting: Geneva, CH, Jan. 17-23, 2013, XP030056435, Jan. 10, 2013, "Algorithm Description", 5 pp.
Chen, et al., "3D-CE2.a related: MB-level depth-to-DV conversion in ATM," JCT3V-C0134, Jan. 17-23, 2013, Joint Collaborative Team on 3D Video Coding Extension Development of ITU-T SG 16 WP 3 and ISO/IEC JTC 1/SC 29/WG 11, Jul. 29, 2013, 3rd Meeting: Geneva, CH, 3 pp.
Zhang, et al., "3D-CE5.h related—Disparity vector derivation for multiview video and 3DV", MPEG Meeting, Apr. 30-May 5, 2012, Geneva, (Motion Picture Expert Group or ISO/IEC JTC1/SC29/WG11),, No. m24937, May 1, 2012, XP030053280, pp. 1-6.
Chang, et al., "3D-CE5.h related: Depth-oriented Neighboring Block Disparity Vector (DoNBDV) with virtual depth", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2, No. JCT3V-B0090, XP030130271, 5 pp.
International Search Report and Written Opinion from International Application No. PCT/US2014/018694, dated May 16, 2014, 12 pp.
Second Written Opinion from International Application No. PCT/US2014/018694, dated Feb. 2, 2015, 8 pp.

Kang, et al, "3D-CE2.h related: Enhanced disparity vector derivation", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-C0050, XP030130466, 4 pp.
Lee, et al., "3D-CE2.h Related Results on Disparity Vector Derivation", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-00097, 4 pp.
Zhang, et al., "3D-CE5.h related: Disparity vector derivation for multiview video and 3DV", MPEG Meeting; Apr. 30-May 4, 2012; Geneva; (Motion Picture Expert Group or ISO/IEC JTC1/SC29/WG11), No. m24937, XP030053280, 6 pp.
Zheng, et al., "Disparity Estimation With Hierarchical Block Correlation for Stereoscopic Image Coding", Systems & Computers in Japan, Wiley, Hoboken, NJ, US, vol. 28, No. 6, Jun. 15, 1997 , XP000723851, 8 pp.
Tech, et al., "JCT-3V AHG report: MV-HEVC/3D-HEVC Test Model editing (AHG3)," ITU-T SG 16 WP 3 and ISO/IEC JTC 1/SC 29/WG 11, Oct. 13-19, 2012, Document: JCT3V-B0003, 4 pp.
Kang, et al., "3D-CE5.h related: Improvements for disparity vector derivation," ITU-T SG 16 WP 3 and ISO/IEC JTC 1/SC 29/WG 11, Oct. 13-19, 2012, Document: JCT3V-B0047, 4 pp.
Su, et al., "3DV-CE1.a: Block-based View Synthesis Prediction for 3DV-ATM," ITU-T SG 16 WP 3 and ISO/IEC JTC 1/SC 29/WG 11, Document: JCT2-A0107, Jul. 16-20, 2012, 5 pp.
Sung, et al., "3D-CE5.h: Simplification of disparity vector derivation for HEVC-based 3D video coding," ITU-T SG 16 WP 3 and ISO/IEC JTC 1/SC 29/WG 11, Document: JCT2-A0126, Jul. 16-20, 2012, 4 pp.
Chang, et al., "CE1.h: Depth-Oriented Neighboring Block Disparity Vector (DoNBDV) with Virtual Depth Retrieval," Media Tek Inc., JCT3V-C0131, 3rd Meeting: Geneva, CH, Jan. 17-23, 2013, XP030056435, 5 pp.
Rusanovskyy, et al., "CE1.a-related: Simplification of BVSP in 3DV-ATM," Nokia Corporation, 3rd Meeting: Geneva, CH, URL: http://phenix.int-evry.fr/jct2/,, No. JCT3V-C0169, Jan. 17-23, 2013, XP030130585, 2 pp.
Zhang et al., "CE5.h: Disparity vector generation results," Joint Collaborative Team on 3D Video Coding Extension Development of ITU-T SG 16 WP 3 and ISO/IEC JTC 1/SC 29/WG 11, Document: JCT2-A0097, Jul. 16-20, 2012, 5 pp.
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.; Section 8.4.2.1, pp. 78-86.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.; Section 8.4.2.1, pp. 85-93.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.; Section 8.4.2.1, pp. 91-101.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.; Section 8.4.2.1, pp. 114-128.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.; Section 8.4.2.1; pp. 111-126.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/

(56) References Cited

OTHER PUBLICATIONS

SC29/WG11 and ITU-T SG.16); JCTVC-H1003, Apr. 2, 2012, 259 pp.; Section 8.5.2.1; pp. 123-134.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-11003_d2, Jun. 1, 2012, 290 pp.; Section 8.4.2.1; pp. 141-153.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.; Section 8.4.2.1; pp. 121-133.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.; Section 8.5.3.1; pp. 138-152.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.; Section 8.5.3.1; pp. 127-142.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.; Section 8.4.1, pp. 171-183 and Section G.8.4.1, pp. 501-511.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.; Section 8.5.3.2; pp. 129-143.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.; Section 8.5.3.2; pp. 152-167.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.; Section 8.5.3.2; pp. 154-169.

Hannuksela et al., "3D-AVC Draft Text 5," JCT3V-C1002, Joint Collaborative Team on 3D Video Coding Extension Developmentof ITU-T SG 16 WP 3 and ISO/IEC JTC 1/SC 29/WG 11, 3rd Meeting: Geneva, CH, Jan. 2013, 82 pp.; Section J.8.3.1; pp. 39-48.

Tech et al., "3D-HEVC Test Model 1," Document JCT3V-A1005_d0, Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, 83 pages.; Section 2.2.1; p. 9, 2.2.2; p. 11, 2.2.3; p. 12, 2.3.4; p. 22, 2.3.8; p. 29.

Tech et al., "3D-HEVC Test Model 2," Joint Collaborative Team on 3D Video Coding Extension Development of ITU-T SG 16 WP 3 and ISO/IEC JTC 1/SC 29/WG 11, Document: JCT3V-B1005_d0, 2nd Meeting: Shanghai, CN, 118 pages, XP030130414, Oct. 13-19, 2012; Section 2.2.1, p. 11; 2.2.2, p. 13; 2.2.3; p. 14, 2.3.4; p. 26 and 2.3.9; p. 34.

Tian, et al.,"CE1.h: Backward View Synthesis Prediction using Neighbouring Blocks", JCT-3V Meeting; MPEG Meeting; Jan. 16-23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-C0152, Jan. 10, 2013; XP030130568, 5 pp.

Hannuksela M. M., et al., "3D-AVC Test Model 4," 2. JCT-3V Meeting; 102. MPEG Meeting; Oct. 13-19, 2012 ; Shanghai, CN (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-B1003, Dec. 21, 2012 (Dec. 21, 2012), 25 pp.; XP030130412, p. 17.

"Decoding and (SVC or scaling or Scalable) and (redefine or derive) and . . . " Google Patent Search performed on Jan. 27, 2017, 1 pp.

Kim et al., "HM9: High Efficiency Video Coding (HEVC) Test Model 9 Encoder Description," 11. JCT-VC Meeting; 102. MPEG Meeting; Oct. 10-19, 2012; Shanghai, CN (Joint Collaborative Team on Video Coding of ISO/IEC JTC1/SC29/WG11 and ITU-T SG.16); URL: http://wftp3.itu.int/av-arch/jctvc-site/ No. JCTVC-K1002v1, Jan. 12, 2013 (Jan. 12, 2013), XP030113268, pp. 1-36.

* cited by examiner

NEIGHBORING BLOCK DISPARITY VECTOR DERIVATION IN 3D VIDEO CODING

This application claims the benefit of:

U.S. Provisional Application No. 61/769,716, filed Feb. 26, 2013,

U.S. Provisional Application No. 61/770,263, filed Feb. 27, 2013,

U.S. Provisional Application No. 61/770,268, filed Feb. 27, 2013,

U.S. Provisional Application No. 61/772,321, filed Mar. 4, 2013,

U.S. Provisional Application No. 61/803,384, filed Mar. 19, 2013, and

U.S. Provisional Application No. 61/815,656, filed Apr. 24, 2013, the contents of each of which are incorporated herein in their entirety.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Extensions of some of the aforementioned standards, including H.264/AVC, provide techniques for multiview video coding in order to produce stereo or three-dimensional ("3D") video. In particular, techniques for multiview coding have been proposed for use in AVC, with the scalable video coding (SVC) standard (which is the scalable extension to H.264/AVC), and the multi-view video coding (MVC) standard (which has become the multiview extension to H.264/AVC).

Typically, stereo video is achieved using two views, e.g., a left view and a right view. A picture of the left view can be displayed substantially simultaneously with a picture of the right view to achieve a three-dimensional video effect. For example, a user may wear polarized, passive glasses that filter the left view from the right view. Alternatively, the pictures of the two views may be shown in rapid succession, and the user may wear active glasses that rapidly shutter the left and right eyes at the same frequency, but with a 90 degree shift in phase.

SUMMARY

In general, this disclosure describes techniques for 3D video coding. In particular, this disclosure is related to neighboring block disparity vector (NBDV) derivation and block-based view synthesis prediction (BVSP) in 3D video coding.

In one example of the disclosure, a method of coding video data comprises coding video data using texture-first coding, and performing an NBDV derivation process for a block of the video data using a plurality of neighboring blocks, wherein the NBDV derivation process derives a disparity vector, and wherein performing the NBDV process comprises designating a motion vector associated with a neighboring block of the plurality of neighboring blocks coded with a block-based view synthesis prediction (BVSP) mode as an available disparity motion vector of one or more available disparity motion vectors, and designating a motion vector associated with a neighboring block of the plurality of neighboring blocks coded using inter-view prediction mode as an available disparity motion vector of the one or more available disparity motion vectors.

In another example of the disclosure, an apparatus configured to code video data comprises a memory configured to store a block of the video data, and a video coder configured to code video data using texture-first coding, and perform a neighboring block-based disparity vector (NBDV) derivation process for the block of the video data using a plurality of neighboring blocks, wherein the NBDV derivation process derives a disparity vector, and wherein performing the NBDV process comprises designating a motion vector associated with a neighboring block of the plurality of neighboring blocks coded with a block-based view synthesis prediction (BVSP) mode as an available disparity motion vector of one or more available disparity motion vectors, and designating a motion vector associated with a neighboring block of the plurality of neighboring blocks coded using inter-view prediction mode as an available disparity motion vector of the one or more available disparity motion vectors.

In another example of the disclosure, an apparatus configured to code video data comprises means for coding video data using texture-first coding, and means for performing a neighboring block-based disparity vector (NBDV) derivation process for a block of the video data using a plurality of neighboring blocks, wherein the NBDV derivation process derives a disparity vector, and wherein the means for performing the NBDV process comprises means for designating a motion vector associated with a neighboring block of the plurality of neighboring blocks coded with a block-based view synthesis prediction (BVSP) mode as an available disparity motion vector of one or more available disparity motion vectors, and means for designating a motion vector associated with a neighboring block of the plurality of neighboring blocks coded using inter-view prediction mode as an available disparity motion vector of the one or more available disparity motion vectors.

In another example, this disclosure describes a computer-readable storage medium storing instructions that, when executed, cause one or more processors configured to code video data to code video data using texture-first coding, and perform a neighboring block-based disparity vector (NBDV) derivation process for the block of the video data using a plurality of neighboring blocks, wherein the NBDV derivation process derives a disparity vector, and wherein performing the NBDV process comprises designating a motion vector associated with a neighboring block of the plurality of neighboring blocks coded with a block-based view synthesis prediction (BVSP) mode as an available disparity motion vector of one or more available disparity motion vectors, and designating a motion vector associated with a neighboring block of the plurality of neighboring blocks coded using inter-view prediction mode as an available disparity motion vector of the one or more available disparity motion vectors.

In another example of the disclosure, a method of coding video data comprises performing a block-based view synthesis prediction (BVSP) process on a block of video data, the BVSP process comprising performing an NBDV derivation process to derive a disparity vector, and refining the derive disparity vector for a sub-region of the block of video data, and coding the block of video data using BVSP, wherein performing the NBDV derivation process comprises designating a motion vector associated with a neighboring block of the plurality of neighboring blocks coded with a block-based view synthesis prediction (BVSP) mode as an available disparity motion vector of one or more available disparity motion vectors, designating a motion vector associated with a neighboring block of the plurality of neighboring blocks coded using inter-view prediction mode as an available disparity motion vector of the one or more available disparity motion vectors, and deriving the disparity vector from the one or more available disparity motion vectors.

In another example of the disclosure, an apparatus configured to code video data comprises a memory configured to store a block of video data, and a video coder configured to perform a block-based view synthesis prediction (BVSP) process on the block of video data, the BVSP process comprising performing an NBDV derivation process to derive a disparity vector, and refining the derive disparity vector for a sub-region of the block of video data, and coding the block of video data using BVSP, wherein performing the NBDV derivation process comprises designating a motion vector associated with a neighboring block of the plurality of neighboring blocks coded with a block-based view synthesis prediction (BVSP) mode as an available disparity motion vector of one or more available disparity motion vectors, designating a motion vector associated with a neighboring block of the plurality of neighboring blocks coded using inter-view prediction mode as an available disparity motion vector of the one or more available disparity motion vectors, and deriving the disparity vector from the one or more available disparity motion vectors.

In another example of the disclosure, an apparatus configured to code video data comprising means for performing a block-based view synthesis prediction (BVSP) process on a block of video data, the means for performing the BVSP process comprising means for performing an NBDV derivation process to derive a disparity vector, and means for refining the derive disparity vector for a sub-region of the block of video data, and means for coding the block of video data using BVSP, wherein the means for performing the NBDV derivation process comprises means for designating a motion vector associated with a neighboring block of the plurality of neighboring blocks coded with a block-based view synthesis prediction (BVSP) mode as an available disparity motion vector of one or more available disparity motion vectors, means for designating a motion vector associated with a neighboring block of the plurality of neighboring blocks coded using inter-view prediction mode as an available disparity motion vector of the one or more available disparity motion vectors, and means for deriving the disparity vector from the one or more available disparity motion vectors.

In another example, this disclosure describes a computer-readable storage medium storing instructions that, when executed, cause one or more processors configured to code video data to perform a block-based view synthesis prediction (BVSP) process on the block of video data, the BVSP process comprising performing an NBDV derivation process to derive a disparity vector, and refining the derive disparity vector for a sub-region of the block of video data, and coding the block of video data using BVSP, wherein performing the NBDV derivation process comprises designating a motion vector associated with a neighboring block of the plurality of neighboring blocks coded with a block-based view synthesis prediction (BVSP) mode as an available disparity motion vector of one or more available disparity motion vectors, designating a motion vector associated with a neighboring block of the plurality of neighboring blocks coded using inter-view prediction mode as an available disparity motion vector of the one or more available disparity motion vectors, and deriving the disparity vector from the one or more available disparity motion vectors.

The details of one or more examples are set forth in the accompanying drawings and the description below. Other features, objects, and advantages will be apparent from the description and drawings, and from the claims.

DETAILED DESCRIPTION

In general, this disclosure describes techniques for multiview plus depth (e.g., 3D) video coding based on advanced codecs, including the coding of two or more views with the H.264/advanced video coding (AVC) codec (e.g., in a 3D extension of H.264/AVC sometimes referred to as 3D-AVC). In some examples, techniques related to view synthesis prediction and disparity vector derivation in 3D AVC-based multiview video coding are proposed. However, the techniques of this disclosure may be generically applicable to other multiview and/or 3D video coding techniques, including multiview and the emerging 3D extensions of the high efficiency video coding (HEVC) standard.

When employing texture-first decoding, current proposals for 3D-AVC lack techniques for deriving accurate disparity vectors. In particular, disparity vectors derived from current proposals for a neighboring block disparity vector (NBDV)

derivation process may produce inaccurate disparity vectors. Furthermore, there are no current techniques for using derived disparity vectors for block-based view synthesis prediction (BVSP) coding when employing texture-first coding.

In view of these drawbacks, this disclosure proposes techniques to enable BVSP for 3D-AVC compliant video encoders and video decoders when the non-base texture view component is coded before the corresponding non-base depth view component. In addition, the coding gain of other inter-coding modes is also improved due to the derivation of an elaborated disparity vector, as provided by the techniques of this disclosure.

Figure 1:
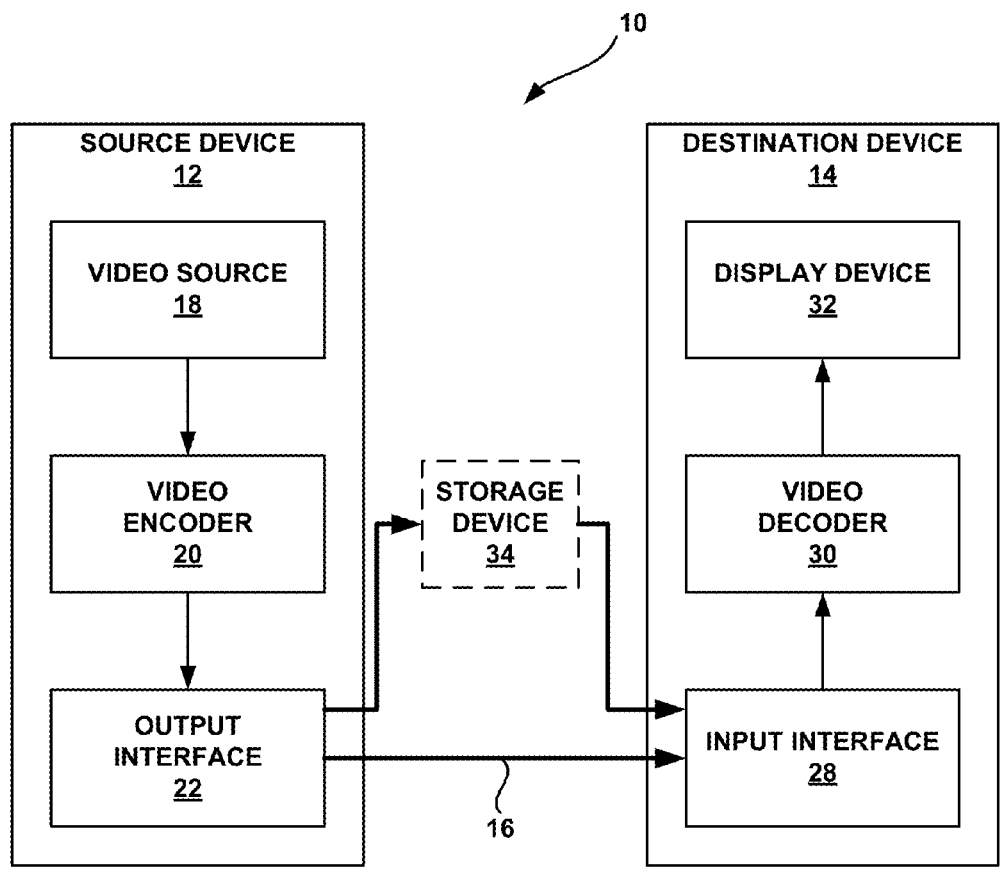
FIG. 1 is a block diagram illustrating an example video encoding and decoding system that may utilize the techniques described in this disclosure.

FIG. 1 is a block diagram illustrating an example video encoding and decoding system 10 that may be configured to perform the techniques for view synthesis prediction and disparity vector derivation described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

System 10 may operate in accordance with different video coding standards, a proprietary standard, or any other way of multiview coding. The following describes a few examples of video coding standards, and should not be considered limiting. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010, the entire content of which is incorporated herein by reference. Another joint draft of the MVC is described in "Advanced video coding for generic audiovisual services," ITU-T Recommendation H.264, June 2011, the entire content of which is incorporated herein by reference. Some additional video coding standards include the MVC+D and 3D-AVC, which are based on AVC. In addition, a new video coding standard, namely the High-Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG).

For purposes of illustration only, the techniques described in this disclosure are described with examples in accordance the H.264 standard, such as the 3D-AVC. However, the techniques described in this disclosure should not be considered limited to these example standards, and may be extendable to other video coding standards for multiview coding or 3D video coding (e.g., 3D-HEVC), or to techniques related to multiview coding or 3D video coding that are not necessarily based on a particular video coding standard. For example, the techniques described in this disclosure are implemented by video encoders/decoders (codecs) for multiview coding, where multiview coding includes coding of two or more views.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure for view synthesis prediction and disparity vector derivation are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. For example, the techniques described in this disclosure may be described from the perspective of an apparatus or a device. As one example, the apparatus or device may include video decoder 30 (e.g., destination device 14 as part of a wireless communication device), and video decoder 30 may include one or more processors configured to implement techniques described in this disclosure (e.g., decode video data in accordance with techniques described in this disclosure). As another example, the apparatus or device may include a micro-processor or an integrated circuit (IC) that includes video decoder 30, and the micro-processor or IC may be part of destination device 14 or another type of device. The same may apply for video encoder 20 (i.e., an apparatus or device like source device 12 and/or a micro-controller or IC includes video encoder 20, where video encoder 20 is configured to encode video data in accordance with techniques described in this disclosure).

When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

A video sequence typically includes a series of video pictures from a view. A group of pictures (GOP) generally comprises a series of one or more video pictures. A GOP may include syntax data in a header of the GOP, a header of one or more pictures of the GOP, or elsewhere, that describes a number of pictures included in the GOP. Each picture may include picture syntax data that describes an encoding mode for the respective picture. Video encoder 20 typically operates on video blocks within individual video pictures in order to encode the video data. A video block may correspond to a macroblock, a partition of a macroblock, and possibly a sub-block of a partition, as defined in the H.264 standard, or a coding unit (CU), a prediction unit (PU), or a transform unit (TU), as defined in the HEVC standard; however, the techniques described in this disclosure are not limited to these examples of blocks. The video blocks may have fixed or varying sizes, and may differ in size according to a specified coding standard. Each video picture may include a plurality of slices. Each slice may include a plurality of blocks.

As an example, the ITU-T H.264 standard supports intra-prediction in various block sizes, such as 16 by 16, 8 by 8, or 4 by 4 for luma components, and 8×8 for chroma components, as well as inter-prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions (e.g., 16×16 pixels or 16 by 16 pixels). In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

When the block is intra-mode encoded (e.g., intra-predicted), the block may include data describing an intra-prediction mode for the block. As another example, when the block is inter-mode encoded (e.g., inter-predicted), the block may include information defining a motion vector for the block. This motion vector refers to a reference picture in the same view (e.g., a temporal motion vector), or refers to a reference picture in another view (e.g., a disparity motion vector). The data defining the motion vector for a block describes, for example, a horizontal component of the motion vector, a vertical component of the motion vector, a resolution for the motion vector (e.g., one-quarter pixel precision or one-eighth pixel precision). In addition, when inter-predicted, the block may include reference index information such as a reference picture to which the motion vector points, and/or a reference picture list (e.g., RefPicList0 or RefPicList1) for the motion vector.

In the H.264 standard, following intra-predictive or inter-predictive coding, video encoder 20 calculates residual data for the macroblocks. The residual data may correspond to pixel differences between pixels of the unencoded picture and prediction values for the macroblock in H.264.

Following any transforms to produce transform coefficients, video encoder 20 performs quantization of the transform coefficients, in some examples. Quantization generally refers to a process in which transform coefficients are quantized to possibly reduce the amount of data used to represent the coefficients, providing further compression. The quantization process reduces the bit depth associated with some or all of the coefficients. For example, an n-bit value is rounded down to an m-bit value during quantization, where n is greater than m.

In some examples, video encoder 20 utilizes a predefined scan order to scan the quantized transform coefficients to produce a serialized vector that can be entropy encoded. In other examples, video encoder 20 performs an adaptive scan. After scanning the quantized transform coefficients to form a one-dimensional vector, in some examples, video encoder 20 entropy encodes the one-dimensional vector according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology, as a few examples. Video encoder 20 also entropy encodes syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video decoder 30 implements the inverse of the techniques of video encoder 20. For example, video decoder 30 decodes the encoded video bitstream and determines the residual blocks by inverse quantization and inverse transform. Video decoder 30 sums the residual blocks with blocks of previously decoded pictures to determine the pixel values for the blocks within the picture.

As described above, the techniques described in this disclosure are directed to 3D-AVC. To better understand the techniques, the following describes some H.264/AVC coding techniques, multiview video coding from the perspective of H.264/MVC extension and the High Efficiency Video Coding (HEVC) standard, and 3D-AVC techniques.

For H.264/Advance Video Coding (AVC), video encoding or decoding (e.g., coding) is implemented on macroblocks, where a macroblock represents a portion of a frame which are inter-predicted or intra-predicted (i.e., inter-prediction encoded or decoded or intra-prediction encoded or decoded). For instance, in H.264/AVC, each inter Macroblock (MB) (e.g., inter-predicted macroblock) may be partitioned into four different ways: one 16×16 MB partition, two 16×8 MB partitions, two 8×16 MB partitions, or four 8×8 MB partitions. Different MB partitions in one MB may have different reference index values for each direction (i.e., RefPicList0 or RefPicList1). When a MB is not partitioned into multiple (more than 1) MB partitions, it has only one motion vector for the whole MB partition in each direction.

As part of video coding (encoding or decoding), video encoder 20 and video decoder 30 are configured to construct one or two reference picture lists, referred to as RefPicList0 and RefPicList1. The reference picture list(s) identify reference pictures that can be used to inter-predict macroblocks of a frame or a slice. For instance, video encoder 20 may signal a reference index and a reference picture list identifier. Video decoder 30 may receive the reference index and the reference picture list identifier and determine the reference picture that is to be used for inter-prediction decoding the current macroblock from the reference index and the reference picture list identifier.

When a MB is partitioned into four 8×8 MB partitions, each 8×8 MB partition can be further partitioned into sub-blocks. There are four different ways to get sub-blocks from an 8×8 MB partition: one 8×8 sub-block, two 8×4 sub-blocks, two 4×8 sub-blocks, or four 4×4 sub-blocks. Each sub-block can have a different motion vector in each direction, but share s the same reference picture index for each direction. The manner in which an 8×8 MB partition is partitioned into sub-blocks is named sub-block partition.

For multiview video coding there are multiple different video coding standards. To avoid confusion, when this disclosure describes multiview video coding generically, this disclosure uses the phrase "multiview video coding." In general, in multiview video coding, there is a base view and one or more enhancement or dependent views. The base view is fully decodable without reference to any of the dependent views (i.e., the base view is only inter-predicted with temporal motion vectors). This allows a codec that is not configured for multiview video coding to still receive at least one view that is fully decodable (i.e., the base view can be extracted out and the other views discarded, allowing a decoder not configured for multiview video coding to still decode the video content albeit without 3D experience). The one or more enhancement or dependent views may be inter-predicted with respect to the base view or with respect to other enhancement view or dependent view (i.e., disparity compensation predicted), or with respect to other pictures in the same view (i.e., motion compensated predicted).

Whereas "multiview video coding" is used generically, the acronym MVC is associated with an extension of H.264/AVC. Accordingly, when the disclosure uses the acronym MVC, the disclosure is referring specifically to the extension to H.264/AVC video coding standard. The MVC extension of H.264/AVC relies upon disparity motion vectors as another type of motion vector in addition to temporal motion vectors. Another video coding standard, referred to as MVC plus depth (MVC+D), has also been developed by JCT-3V and MPEG. MVC+D applies the same low-level coding tools as those of MVC for both texture and depth and the decoding of depth is independent to the decoding of texture and vice-versa. For instance, in MVC, a frame is represented only by one view component, referred to as a texture view component, or simply texture. In MVC+D, there are two view components: texture view component and depth view component, or simply texture and depth. For example, in MVC+D, each view includes a texture view and a depth view, where the view includes a plurality of view components, the texture view includes a plurality of texture view components, and the depth view includes a plurality of depth view components.

Each texture view component is associated with a depth view component to form a view component of a view. The depth view component represents relative depth of the objects in the texture view component. In MVC+D, the depth view component and the texture view component are separately decodable. For example, video decoder 30 may implement two instances of an MVC codec, in which a first codec decodes the texture view components and a second coded decodes the depth view components. These two codecs can execute independent of one another because the texture view components and the depth view components are separately encoded.

In MVC+D, a depth view component is always immediately following the associated (e.g., corresponding) texture view component. In this manner, MVC+D supports texture-first coding, where the texture view component is decoded prior to the depth view component.

A texture view component and its associated (e.g., corresponding) depth view component may include the same picture order count (POC) value and view_id (i.e., the POC value and view_id of a texture view component and its associated depth view component is the same). The POC value indicates the display order of the texture view component and the view_id indicates the view to which the texture view component and depth view component belong.

Figure 2:
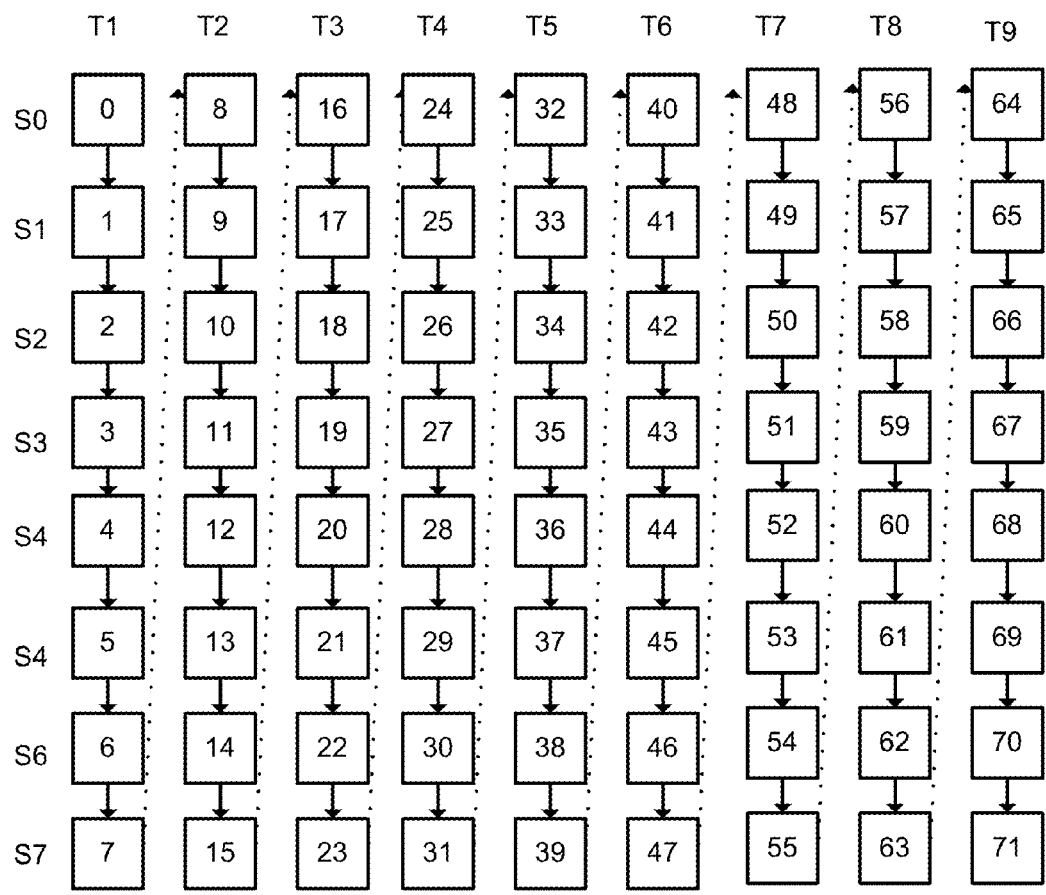
FIG. 2 is a conceptual diagram illustrating an example multiview decoding order.

A typical MVC decoding order (i.e. bitstream order) is shown in FIG. 2. The decoding order arrangement is referred as time-first coding. Note that the decoding order of access units may not be identical to the output or display order. In FIG. 2, S0-S7 each refers to different views of the multiview video. T0-T8 each represents one output time instance. An access unit may include the coded pictures of all the views for one output time instance. For example, a first access unit may include all of the views S0-S7 for time instance T0, a second access unit may include all of the views S0-S7 for time instance T1, and so forth.

For purposes of brevity, the disclosure may use the following definitions:

view component: A coded representation of a view in a single access unit. When a view includes both coded texture and depth representations, a view component may include a texture view component and a depth view component.

texture view component: A coded representation of the texture of a view in a single access unit.

depth view component: A coded representation of the depth of a view in a single access unit.

As discussed above, in the context of this disclosure, the view component, texture view component, and depth view component may be generally referred to as a layer. In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component is a gray scale image that includes only luma values. In other words, the depth view component may not convey any image content, but rather provide a measure of the relative depths of the pixels in the texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose.

The depth view component using only luma values (e.g., intensity values) to identify depth is provided for illustration purposes and should not be considered limiting. In other examples, any technique may be utilized to indicate relative depths of the pixels in the texture view component.

Figure 3:
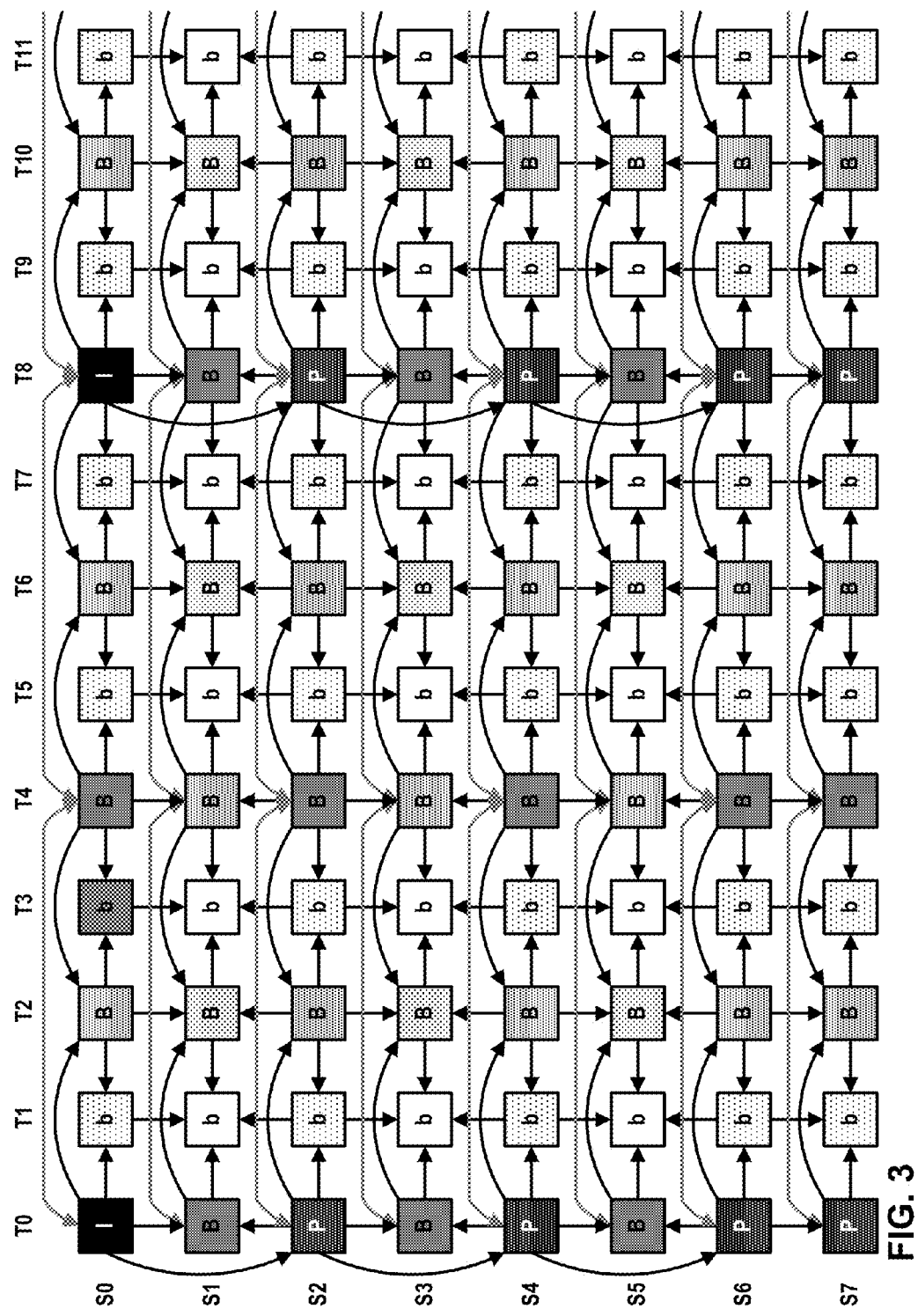
FIG. 3 is a conceptual diagram illustrating an example prediction structure for multiview coding.

A typical MVC prediction structure (including both inter-picture prediction within each view and inter-view prediction between views) for multi-view video coding is shown in FIG. 3. Prediction directions are indicated by arrows, the pointed-to object using the pointed-from object as the prediction reference. In MVC, inter-view prediction is supported by disparity motion compensation, which uses the syntax of the H.264/AVC motion compensation, but allows a picture in a different view to be used as a reference picture.

In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location.

Although MVC has a so-called base view, which is decodable by H.264/AVC decoders, and stereo view pairs could be supported also by MVC, the advantage of MVC is that it could support an example that uses more than two views as a 3D video input and decodes this 3D video represented by the multiple views. A renderer of a client having an MVC decoder may expect 3D video content with multiple views.

Pictures in FIG. 3 are indicated at the intersection of each row and each column. The H.264/AVC standard may use the term frame to represent a portion of the video. This disclosure may use the term picture and frame interchangeably.

The pictures in FIG. 3 are illustrated using a block including a letter, the letter designating whether the corresponding picture is intra-coded (that is, an I-picture), or inter-coded in one direction (that is, as a P-picture) or in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multi-view video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Inter-view prediction is also a feature of proposed multiview extension of HEVC, including 3D-HEVC (multiview plus depth).

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In some examples, FIG. 3 may be viewed as illustrating the texture view components. For example, the I-, P-, B-, and b-pictures illustrated in FIG. 2 may be considered as texture view components for each of the views. In accordance with the techniques described in this disclosure, for each of the texture view components illustrated in FIG. 3 there is a corresponding depth view component. In some examples, the depth view components may be predicted in a manner similar to that illustrated in FIG. 3 for the corresponding texture view components.

Coding of two views may also be supported by MVC. One of the advantages of MVC is that an MVC encoder may take more than two views as a 3D video input and an MVC decoder may decode such a multiview representation. As such, any renderer with an MVC decoder may decode 3D video content with more than two views.

As discussed above, in MVC, inter-view prediction is allowed among pictures in the same access unit (meaning, in some instances, with the same time instance). When coding a picture in one of the non-base views, a picture may be added into a reference picture list, if it is in a different view but within a same time instance. An inter-view prediction reference picture may be put in any position of a reference picture list, just like any inter-prediction reference picture. As shown in FIG. 3, a view component can use the view components in other views for reference. In MVC, inter-view prediction is realized as if the view component in another view was an inter-prediction reference.

In MVC, inter-view prediction is allowed among pictures in the same access unit (i.e., with the same time instance). When coding a picture in one of the non-base views, a picture may be added into a reference picture list, if it is in a different view but with a same time instance. An inter-view prediction reference picture can be put in any position of a reference picture list, just like any inter prediction reference picture.

As shown in FIG. 3, a view component can use the view components in other views for reference. This is called inter-view prediction. In MVC, inter-view prediction is realized as if the view component in another view was an inter prediction reference.

In the context of multiview video coding, there are two kinds of motion vectors. One is a normal motion vector pointing to temporal reference pictures. The corresponding temporal inter prediction is motion-compensated prediction (MCP). The other type of motion vector is a disparity motion vector pointing to pictures in a different view (i.e., inter-view reference pictures). The corresponding inter prediction is disparity-compensated prediction (DCP).

Currently, a Joint Collaboration Team on 3D Video Coding (JCT-3V) of VCEG and MPEG is developing a 3DV standard based on H.264/AVC, i.e., 3D-AVC. For 3D-AVC, new coding tools besides the inter-view prediction in MVC have been included and supported. The latest software 3D-ATM for 3D-AVC can be downloaded from the following link: [3D-ATM version 6.2]: http://mpeg3 dv.research. nokia.com/svn/mpeg3dv/tags/3DV-ATMv6.2/

AVC based 3D video (3D-AVC) coding standard is currently under development by JCT-3V, and the latest version of 3D-AVC is now available in public: M. M. Hannuksela, Y. Chen, T. Suzuki, J.-R. Ohm, G. J. Sullivan, "3D-AVC draft text 5," JCT3V-C1002, Geneva, CH, January, 2013. It is available from the following link, and is hereby incorporated by reference: http://phenix.it-sudparis.eu/jct2/doc_end_user/documents/3_Geneva/wg11/JCT3V-C1002-v3.zip.

3D-AVC is compatible to H.264/AVC in a way that the texture part of the base view is fully decodable for H.264/AVC decoder. For example, the texture view components in view components of the base view may only be inter-predicted with other texture view components in the same base view. The texture view components in the base view may not inter-view predicted. Also, the texture view component in the base view may not require the corresponding depth view component for decoding purposes.

For enhanced view components in 3D-AVC, in some other example techniques, the depth may be coded prior to the texture and a texture view component may be coded based on the information from the depth view component, which is also known as a depth-first coding. However, each texture view component is coded before the respective depth view components in texture-first coding order, such as in MVC+D described above. In other words, in some other example techniques, in 3D-AVC, the texture view component of the base view is coded first, followed by the associated depth view component of the base view, followed by the depth view component of a first enhancement or dependent view, followed by the associated texture view component of the first enhancement or dependent view, followed by the depth view component of a second enhancement or dependent view, followed by the associated texture view component of the second enhancement or dependent view, and so forth.

For example, the coding orders of the texture and depth view components in 3D-AVC are exemplified as follows. In the following examples, T0 and D0, respectively, refer to the texture and depth view components of the base view, and Ti and Di, respectively, refer to the texture and depth view components of the i-th dependent view. In the following examples, three views are considered.

In a first example, the views considered are T0, D0, D1, D2, T1, and T2. In this example, the base views (T0 and D0) are coded with texture-first coding order while the dependent views are coded with the depth-first coding order. A hybrid coding order is currently used in common test conditions of 3D-AVC. In another example, the order of coding is T0, D0, T1, D1, T2, and D2. That is, all view components are coded with texture-first coding order. If inter-view prediction is enabled for Ti, the reference texture view is defined as the view which includes the inter-view reference picture and the corresponding depth view is defined as the reference depth view which has the same view order index as that of the reference texture view.

Some other 3D-AVC techniques required depth first-coding because deriving a disparity vector for a block of the texture view component required the corresponding depth view component. The following describes such disparity vector derivation via the depth map. Techniques for deriving the disparity vector may vary with each low-level coding tool, but, commonly, the depth data of the dependent view is used for disparity vector derivation for the texture view component coding. This is because the depth view of the dependent view is available, due to the depth-first coding order. The low-level coding tools used are in-loop block-based view synthesis inter-view prediction (BVSP) and depth-based motion vector prediction (D-MVP) in 3D-AVC. A video coder, e.g., video decoder 30 may use the disparity vector converted from the depth values of the depth view (sometimes called depth map) in the dependent view (sometimes called dependent frame). In 3D-AVC reference software, typically, the results of the conversion process from the actual depth map value to a disparity to a particular view are stored in look-up tables with camera parameters.

Figure 4:
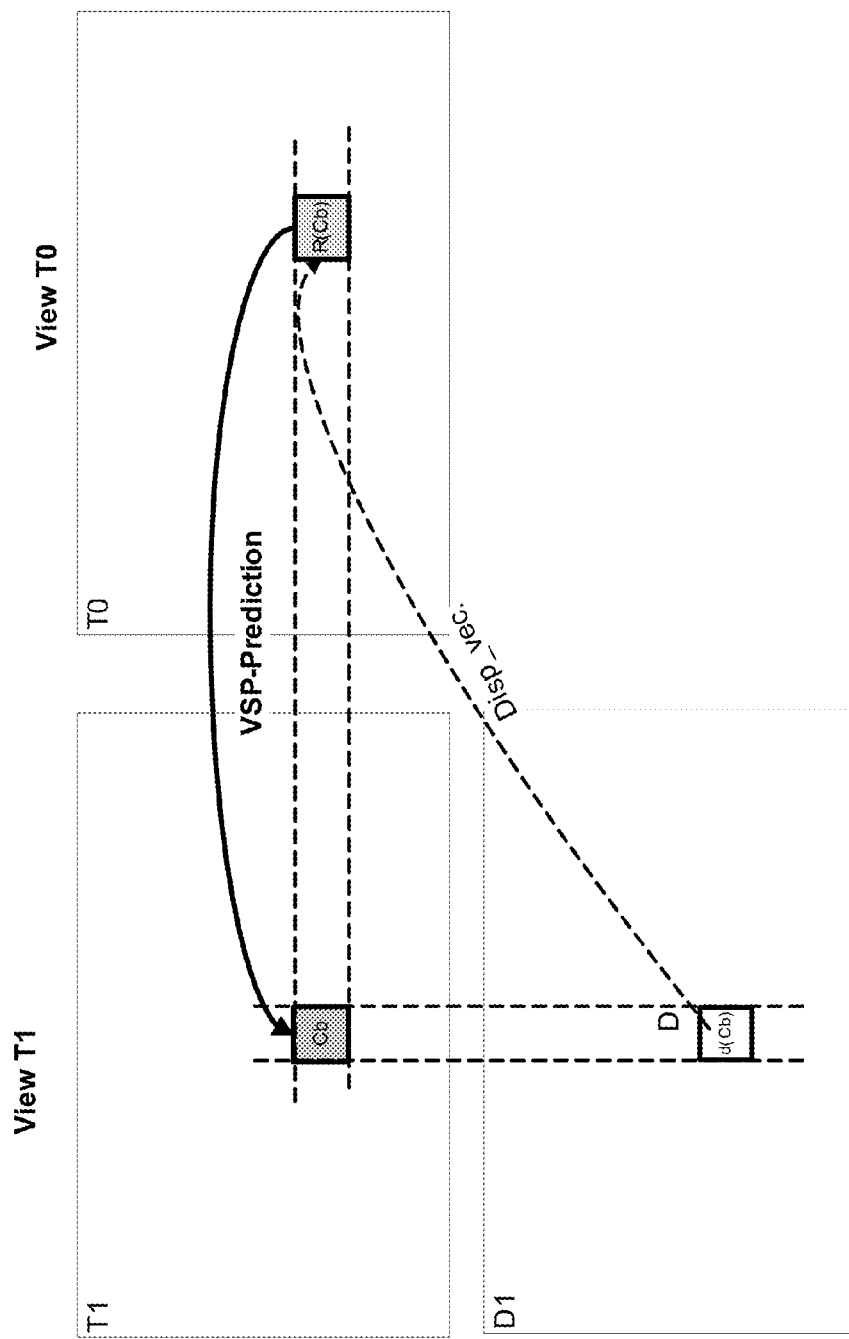
FIG. 4 is a conceptual visualization of block-based view synthesis prediction based on backward warping.

FIG. 4 is a conceptual diagram of BVSP based on backward warping. BVSP was originally proposed in "3DV-CE1.a: Block-Based View Synthesis Prediction for 3DV-ATM" (JCT3V-A0107) by W. Su, et al., which can be downloaded from the following link, and is hereby incorporated by reference: http://phenix.it-sudparis.eu/jct2/doc_end_user/documents/1 Stockholm/wg11/JCT3V-A0107-v1.zip. Referring to FIG. 4, assume that the following coding order is utilized: (T0, D0, D1, T1). Texture component T0 is a base view, and T1 is a dependent view coded with VSP (view synthesis prediction). Depth map components D0 and D1 are respective depth maps associated with T0 and T1.

In dependent view T1, sample values of currently coded block Cb are predicted from reference area R(Cb) (VSP-Prediction) that consists of sample values of the base view T0. The displacement vector (Disp_vec) between current samples to be coded and reference samples is denoted as a derived disparity vector between T1 and T0 from a depth map value associated with a currently coded texture sample.

The process of conversion from a depth value to a disparity vector may be performed for example with following equations:

$$Z(Cb(j, i)) = \frac{1}{\frac{d(Cb(j, i))}{255} \cdot \left(\frac{1}{Znear} - \frac{1}{Zfar}\right) + \frac{1}{Zfar}}; \quad (1)$$

$$D(Cb(j, i)) = \frac{f \cdot b}{Z(Cb(j, i))}; \quad (2)$$

where j and i are local spatial coordinates within Cb, d Cb(j,i) is a depth map value in depth map image of a view 1, Z is the actual corresponding depth value, and D is the horizontal component of a derived disparity vector to a particular view 0. The parameters f, b, Znear and Zfar are parameters specifying the camera setup; i.e., the used focal length (f), camera separation (b) between view #1 and view #0, and depth range (Znear, Zfar) representing parameters of depth map conversion.

Note that, in some examples, the vertical component of the derived disparity vector is set to 0. Also, in some 3DV-ATM implementation, equations (1) and (2) have been already pre-computed for every depth map value (0 . . . 255) and stored as a look up-table.

The next section will discuss several implementation issues of BVSP. One issue involves the indication of BVSP blocks. BVSP blocks are indicated as follows:

One flag at MB-level is used to signal whether the current MB is coded with the conventional skip/direct mode or it is coded with the skip/direct mode but predicted from a synthetic reference component.

For each MB partition (from 16×16 to 8×8), a reference index (or a flag, as in some proposals for 3D-AVC) in each reference picture list is used to signal the reference picture. When a partition is coded in BVSP mode, motion vector differences are not signaled since there are no motion vectors for BVSP coded blocks.

When either the flag or the reference index indicates a synthetic reference component, the prediction of one partition as described in the following item is invoked. For each MB partition, with its size denoted by N×M (wherein N or M shall be 8 or 16), if the MB partition is coded with BVSP mode, a current MB partition is further partitioned into several sub-regions with a size equal to K×K (wherein K may be 8×8, as in some proposals for 3D-AVC, 4×4, 2×2 or 1×1). For each sub-region, a separate disparity vector is derived and each sub-region is predicted from one block located by the derived disparity vector in the inter-view reference picture, i.e., R(cb) in FIG. 4. In some example common test conditions, K is defined to be 4. Note that the derived disparity vectors are not stored for BVSP coded blocks, since there are no coding tools that use such vectors.

Another implementation issue involves the disparity vector derivation process. When depth-first coding order is applied, the derived disparity vector may be obtained by converting a depth value of the corresponding depth block in the corresponding non-base depth view, as shown in FIG. 4. Several techniques may be applied to select the depth value of one depth block, such as, the depth value of the center position of the depth block, the maximum value of all depth values within one depth block, the maximum value of four corner pixels within one depth block, and the depth value of the bottom-right pixel of the depth block/depth MB. When texture first coding order is applied, BVSP modes will be disabled, since the corresponding non-base depth view is unavailable when decoding the non-base texture view.

Depth-based motion vector prediction (D-MVP) in 3D-AVC for normal inter modes will now be discussed. D-MVP refers to a motion vector prediction method incorporating the associated depth map data in the current view, which is available due to the depth-first coding order. The method is applied with the texture view components in dependent views.

Figure 8:
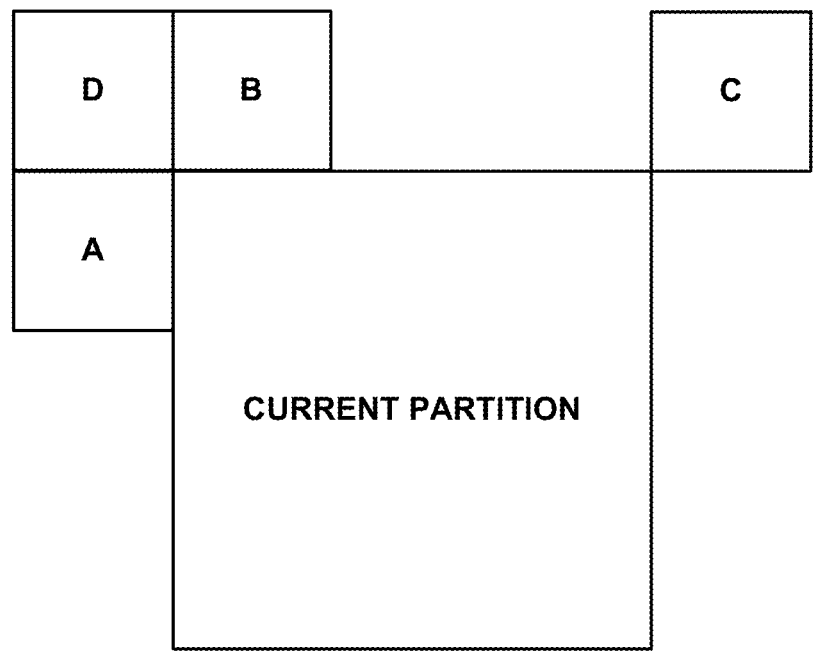
FIG. 8 is a conceptual diagram showing neighboring blocks for depth-based motion vector prediction.

In 3D-AVC, the D-MVP method is incorporated into the conventional median function-based motion vector prediction of H.264/AVC. Specifically, the type of motion vector to be predicted (i.e., whether a temporal motion vector or disparity motion vector) is first identified from the reference indices of the motion vectors in neighboring blocks, and thus the type of motion prediction is determined. As shown in FIG. 8, the neighboring blocks for a current partition may include, in order, a left block (denoted as 'A'), an above block (denoted as 'B'), an above-right block (denoted as 'C') and an above-left block (denoted as 'D') relative to the current block. The motion vector in the above-left block may be used when one of the other three neighboring blocks do not contain a motion vector, and are thus considered as unavailable.

Assuming that the motion vectors of the three neighboring blocks are available, the motion vectors in the three neighboring blocks are employed for motion vector prediction of the current block. In temporal prediction, if their motion vectors all have the same type and have the same reference indices, a median filter is directly used, as in H.264/AVC. Otherwise, if the motion vectors belong to different types and have different reference indices, a motion vector for the current block is further derived. When the current reference picture is an inter-view reference picture, the motion vector types and their reference indices in neighboring block positions are checked. If the neighboring blocks all have the same type and the same reference indices, the median filter is applied. In both cases, if less than three neighboring blocks are available, motion vectors for the unavailable blocks are further derived so that three neighboring blocks become available.

A motion vector derived for a neighboring block is called a derived motion vector, and is generated as follows. If the current motion vector is a disparity motion vector, and the motion vector of the neighboring block has a different type than that of the current motion vector (or is unavailable), the derived motion vector of the neighboring block is set to be a disparity motion vector, which is converted from the corresponding depth view component. The corresponding block of the depth view component of the same view is used, and the maximum value of the depth values of the four corners of this corresponding block is converted to a disparity value, which becomes the horizontal component of the derived motion vector. The vertical component of the derived motion vector is set to be zero.

If the current motion vector is a temporal motion vector, the disparity value (derived as discussed above) is used to determine a temporal motion vector of the reference block in the reference (base) view, and the derived motion vector is set to be the temporal motion vector. If the temporal motion vector is considered to be unavailable (e.g., in the case of an intra block, or if the motion vector does not point to a reference picture in the reference view aligned with the current reference picture), the derived motion vector is set to zero.

Inter-view motion prediction in 3D-AVC for skip and direct modes will now be discussed. Inter-view motion prediction in 3D-AVC is performed in P-skip, B-skip, B-16×16 direct mode, and B-8×8 direct mode. A disparity vector may be initially derived from the neighboring blocks, as well as the deriving a disparity vector converted from the depth values of the depth view component of the same view.

If one available spatial neighboring block contains a disparity motion vector, this disparity motion vector becomes the disparity vector for the current block. Otherwise, for neighboring blocks that do not contain a disparity motion vector, a disparity motion vector to be used for the current block is converted from the depth values corresponding to the same view (similar to the conversion in D-MVP). In some examples, a median filter is applied to three neighboring blocks to obtain disparity vector.

The derived vector may be used to obtain a temporal motion vector relative to the reference block in the reference (base) view. If the temporal motion vector is unavailable, the reference index may first be derived, and the D-MVP process, discussed above, is applied to produce a motion vector predictor.

Neighboring block-based disparity vector (NBDV) derivation will now be discussed. NBDV is used as a disparity vector derivation method in 3D-HEVC when texture-first coding order is used for all the views. In the current 3D-HEVC design, NBDV derivation is also used to retrieve a depth data from reference view's depth map.

One version of the reference software description, as well as the working draft of 3D-HEVC is to be available as follows, and is hereby incorporated by reference: Gerhard Tech, Krzysztof Wegner, Ying Chen, Sehoon Yea, "3D-HEVC Test Model Description draft 2," JCT3V-B1005, Joint Collaborative Team on 3D Video Coding Extension Development of ITU-T SG 16 WP 3 and ISO/IEC JTC 1/SC 29/WG 11, 2nd Meeting: Shanghai, CN, October 2012.

A disparity vector (DV) is used as an estimator of the disparity between two views. That is, a disparity vector is a pointer, relative to a block in a current picture, to a corresponding block in an already coded picture in the same time instance. Because neighboring blocks share almost the same motion/disparity information in video coding, the current block can use the motion vector information in neighboring blocks as a good predictor. Following this idea, the NBDV derivation process uses the disparity information of neighboring blocks for estimating the disparity vector in different views.

For performing NDBD derivation, candidate neighboring blocks are initially defined. Two sets of neighboring candidate blocks are utilized. One set is from spatial neighboring blocks and the other set is from temporal neighboring blocks. Each of the spatial and temporal neighboring candidate blocks is then checked in a pre-defined order determined by the priority of the correlation between the current block and the candidate block. Once a disparity motion vector (i.e., the motion vector points to an inter-view reference picture) is found in the candidates, the disparity motion vector is converted to a disparity vector.

Specific examples of NBDV derivation in 3D-HEVC will now be discussed. 3D-HEVC first adopted the Neighboring Block (based) Disparity Vector (NBDV) method proposed in JCT3V-A0097. Implicit disparity vectors were included with a simplified NBDV derivation process in JCTVC-A0126. On top of that, in JCT3V-B0047, NBDV derivation is further simplified by removing the implicit disparity vectors stored in the decoded picture buffer, but also improved a coding gain with the random access point (RAP) picture selection.

JCT3V-A0097: 3D-CE5.h: Disparity vector generation results, L. Zhang, Y. Chen, M. Karczewicz (Qualcomm) is hereby incorporated by reference.

JCT3V-A0126: 3D-CE5.h: Simplification of disparity vector derivation for HEVC-based 3D video coding, J. Sung, M. Koo, S. Yea (LG) is hereby incorporated by reference.

JCT3V-B0047: 3D-CE5.h related: Improvements for disparity vector derivation, J. Kang, Y. Chen, L. Zhang, M. Karczewicz (Qualcomm) is hereby incorporated by reference.

Figure 5:
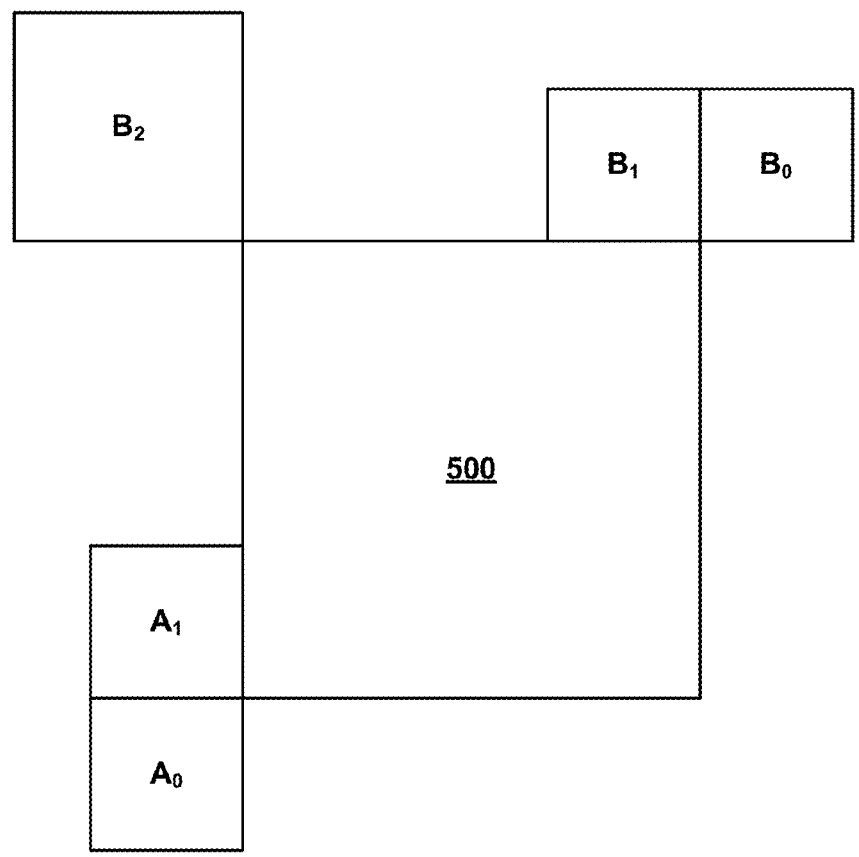
FIG. 5 is a conceptual diagram showing spatial neighboring blocks used for neighboring block disparity vector derivation.

In some proposals for NBDV derivation, five spatial neighboring blocks are used for the disparity vector derivation. As shown in FIG. 5, the five spatial neighbor blocks are the below-left, left, above-right, above and above-left blocks of the current PU 500, as denoted by A0, A1, B0, B1 or B2. It should be noted that they are the same as those used in the merge modes in HEVC. Therefore, no additional memory access is required.

Before checking temporal neighboring blocks, a construction process of candidate picture list is performed first. All the reference pictures from the current view may be treated as candidate pictures. A co-located reference picture is first inserted to the candidate picture list, followed by the rest of the candidate pictures in the ascending order of reference index. When the reference pictures with the same reference index in both reference picture lists are available, the reference picture that is in the same reference picture list as the co-located picture precedes the other reference picture having the matching reference index. For each candidate picture in the candidate picture list, three candidate regions are determined for deriving the temporal neighboring blocks.

When a block is coded with inter-view motion prediction, a disparity vector is derived for selecting a corresponding block in a different view. The disparity vector derived in inter-view motion prediction may be referred to as an implicit disparity vector (IDV). Even though the block is coded with motion prediction, the IDVs are not discarded for the purpose of coding a following block.

Typically, the NBDV derivation process involves checking the disparity motion vectors in the temporal neighboring blocks, disparity motion vectors in the spatial neighboring blocks, and then the IDV, in that order. Once, the disparity vector is found, the process is terminated.

Backward VSP in 3D-HEVC will now be discussed. In 3D-HEVC, when the texture-first coding order is applied, for each prediction unit (PU), a disparity vector could be derived from the NBDV derivation process with or without considering the depth values in the reference depth view. After a disparity vector is obtained, it will be further refined for each M×N (wherein M/N may be equal to 8 or 4, for example) sub-region of one PU if it is coded with BVSP mode.

The refinement process includes two steps: 1) select one maximum depth value from the M×N depth block in the reference depth view which is located by the derived disparity vector; 2) convert the depth value to a horizontal component of the refined disparity vector while keeping the vertical component of the refined disparity vector to be 0. After the disparity vector is refined for one M×N sub-region of one PU, the refined disparity vector is used to locate one block in the reference texture view for motion compensation.

The NBDV derivation process in 3D-AVC will now be discussed. As described in co-pending U.S. patent application Ser. No. 14/189,177, filed Feb. 25, 2014, which is incorporated by reference herein, MB-level NBDV derivation may be used to derive a disparity vector for the current MB. The derived disparity vector may further be used for motion vector prediction. Once a disparity motion vector is identified, i.e., one of the temporal or spatial neighboring block uses the inter-view reference picture, it is returned as the disparity vector for the current MB.

The following describes the techniques of U.S. patent application Ser. No. 14/189,177 in more detail. Some previous 3D-AVC techniques required the depth view component of the texture view component to be available for the disparity vector derivation (i.e., requires depth-first coding for dependent or enhancement views), which leads to issues such as decoding latency, implementation complexity, lack of scalability to other video coding standards, bandwidth inefficiencies if depth view components are not needed, and other potential drawbacks.

The techniques described in U.S. patent application Ser. No. 14/189,177 allow for disparity vector derivation that does not require relying on the corresponding depth view component. In this manner, the techniques allow for texture-first coding in 3D-AVC for dependent views with disparity vector derivation. To achieve disparity vector derivation, the techniques described in U.S. patent application Ser. No. 14/189,177 rely upon the motion vector information of neighboring blocks. As one example, if a motion vector for a neighboring block is a disparity motion vector, the techniques utilize the disparity motion vector of the neighboring block as a disparity vector for the current block. In this manner, video encoder 20 and video decoder 30 may determine a disparity vector for the current macroblock of a texture view component without needing to rely on the corresponding depth view component.

Video encoder 20 and video decoder 30 may be configured to implement the techniques described in U.S. patent application Ser. No. 14/189,177. For example, video encoder 20 and video decoder 30 may be configured to implement techniques that enable efficient coding of 3D-AVC by allowing the texture view to be coded first for each view component. Video encoder 20 and video decoder 30 may derive a disparity vector using a notion of the NBDV that considers more than one available disparity motion vector from the spatial/temporal neighboring blocks of the current block when the corresponding depth data is not available (or not yet available) in 3D-AVC due to a texture-first coding order.

As one example, video decoder 30 may receive a coded bitstream in a 3D-AVC compliant video coding process generated with texture-first coding of dependent views. In this example, the 3D-AVC compliant video coding process refers to a video coding process that uses video coding tools defined in the 3D-AVC video coding standard. The texture-first coding of dependent views refers to the case where the texture view components are coded prior to the corresponding depth view components (i.e., T0, D0, T1, D1, and so forth).

Video decoder 30 may decode a texture view component of a dependent view of the dependent views in the 3D-AVC compliant video coding process. In this example, to decode the texture view component, video decoder 30 may be configured to evaluate motion information of one or more neighboring blocks of a current block in the texture view component to determine whether at least one neighboring block is inter-view predicted with a disparity motion vector that refers to an inter-view reference picture in a view other than the dependent view. Also, to decode the texture view component, video decoder 30 may be configured to derive a disparity vector for the current block based on the disparity motion vector for one of the neighboring blocks. Video decoder 30 may decode a depth view component that corresponds to the texture view component subsequent to decoding the texture view component.

As another example, video encoder 20 may encode a texture view component of a dependent view in a 3D-AVC compliant video coding process. In this example, to encode the texture view component, video encoder 20 may be configured to evaluate motion information of one or more neighboring blocks of a current block in the texture view component to determine whether at least one neighboring block is inter-view predicted with a disparity motion vector that refers to an inter-view reference picture in a view other than the dependent view. Also, to encode the texture view component, video encoder 20 may be configured to derive a disparity vector for the current block based on the disparity motion vector for one of the neighboring blocks.

Video encoder 20 may encode a depth view component that corresponds to the texture view component subsequent to encoding the texture view component. Video encoder 20 may also generate for output a coded bitstream with texture-first coding of dependent views that includes the encoded texture view component and the encoded depth view component.

Current proposals for 3D-AVC exhibit the following problems. When utilizing the NBDV method described in U.S. patent application Ser. No. 14/189,177, BVSP becomes less efficient, mainly due to the reason that the disparity vectors are not always accurate enough. Also, derived disparity vectors (e.g., from NBDV) for BVSP blocks may provide more accurate disparity vectors for the block to be coded. However, use of such derived disparity vectors in BVSP has not been previously employed with NBDV derivation.

In view of these drawbacks, this disclosure provides solutions to enable BVSP for 3D-AVC compliant video encoders and video decoders when the non-base texture view component is coded before the corresponding non-base depth view component. In addition, the coding gain of other inter coding modes is also improved due to the derivation of an elaborated disparity vector, as is provided by the techniques of this disclosure.

Initially, an improved NBDV derivation process is proposed in this disclosure. The NBDV derivation process of this disclosure is modified to incorporate BVSP, although certain aspects of this disclosure do not necessarily require BVSP. The following description will be described with reference to video decoder 30, though it should be understood that each of the techniques below may be implemented by video encoder 20 as well. Both video decoder 30 and video encoder 20 may be implemented with one or more processors configured to execute the techniques of this disclosure. In some examples, the one or more processors of video decoder 30 and video encoder 20 may be configured to execute software stored on one or more non-transitory computer-readable storage media. It should also be understood, in the context of this disclosure, a "video coder" is a generic term that applies to both a video encoder and a video decoder. Likewise, the term "video coding" could refer to either video encoding or video decoding.

As a first example NBDV derivation process of this disclosure, video decoder 30 is configured to determine if a spatial or temporal neighboring block is coded with the BVSP mode. This check is performed for each spatial or temporal neighboring block defined for the NBDV derivation process. If a neighboring block is coded with BVSP mode, video decoder 30 designates the motion vector belonging to the neighboring block coded with BVSP mode as a disparity motion vector, regardless of whether the neighboring block is located in the current picture or in a different picture. In other words, video decoder 30 designates both motion vectors in neighboring blocks coded with BVSP, and motion vectors in neighboring blocks coded with inter-view prediction as available disparity motion vectors during the NBDV derivation process.

In a second example NBDV derivation process of this disclosure, the MB-level NBDV derivation process for one MB partition using the techniques of U.S. patent application Ser. No. 14/189,177 may be improved by checking the usage of BVSP modes in neighboring blocks.

In a first aspect of the second example, video decoder 30 may be configured to derive a disparity vector using NBDV derivation using each temporal and/or spatial neighboring block, when either of the two following conditions below is true: (1) if the neighboring block is coded using inter-view prediction, or (2) if the neighboring block is coded using BVSP mode. In the case that the neighboring block is coded using inter-view prediction, video decoder 30 designates the disparity motion vector associated with the neighboring block as the disparity vector for the current block. If the neighboring block was coded using BVSP mode, video decoder 30 designates the disparity vector generated during the decoding of the neighboring block as the disparity vector for the current block.

In a second aspect of the second example of the disclosure, video decoder 30 may be to employ a two-stage checking procedure. First, video decoder 30 is configured to check whether at least one of the spatial and/or temporal neighboring blocks is coded using inter-view prediction. If not, video decoder 30 then checks whether at least one of the spatial and/or temporal neighboring blocks is coded using BVSP mode.

In a third aspect of the second example of the disclosure, the two-stage checking process described above is flipped. That is, video decoder 30 is configured to first check whether at least one of the neighboring blocks is coded using the BVSP mode. If not, video decoder 30 is configured to then check whether at least one of all the spatial (and/or) temporal neighboring blocks are coded using inter-view prediction.

Each of the above-described aspects of the second example may be applied to partition-level NBDV derivation algorithms, as well as MB-level NBDV derivation algorithms.

In a third example NBDV derivation process of this disclosure, the MB-level NBDV derivation process may be further refined by adding an additional step to the end of the process that includes accessing the reference depth view. In some examples, video decoder 30 may be configured to employ this additional step to blocks coded using BVSP mode, to inter predicted blocks not coded using BVSP mode, or to all inter predicted blocks.

In a first aspect of the third example, video decoder 30 may be configured to select one depth value from one depth block in the depth reference view, and convert that depth value to an updated disparity vector. This updated disparity vector is then applied to all MB partitions within the current MB. In some examples, video decoder 30 may be further configured to store this updated/refined disparity vector as the final disparity motion vector of the current MB or MB partition.

In a fourth example NBDV derivation process of this disclosure, video decoder 30 may be configured to store the derived disparity vector (i.e., derived using NBDV derivation) of the MB as the motion vector for current MB after the current MB is decoded.

In a fifth example NBDV derivation process of this disclosure, video decoder 30 may be configured to allocate additional memory for MBs which include at least one MB partition coded using BVSP mode. In this case, the disparity vectors of MBs can be stored and do not need to overwrite any decoded motion vectors of MB partitions.

In a first aspect of the fifth example, one additional motion vector per MB is allocated to store the disparity vector of the MB derived from the NBDV derivation process in the case that at least one MB partition is coded using BVSP mode.

In second aspect of the fifth example, when employing the NBDV derivation process, video decoder 30 may be further configured use the disparity vector associated with the MB which contains this neighboring block as a disparity vector for the current MB when the neighboring block is coded using BVSP mode.

In a sixth example the NBDV derivation process of this disclosure, video decoder 30 may be configured to employ any combination of the above example techniques to coding tools which depend on a disparity vector, such as D-MVP in normal inter modes and inter-view motion vector prediction in skip and direct modes. In this example, the results of an improved NBDV derivation process are used for the coding tools. For example, during the D-MVP process, the resultant disparity vector generated from the improved NBDV derivation process of this disclosure maybe used to replace the result of other NBDV derivation processes (e.g., the result from the NBDV derivation process described in U.S. patent application Ser. No. 14/189,177).

It should be understood that any of the above examples, and aspects of examples, may be performed together in any combination.

An improved BVSP process is also proposed in this disclosure using the improved NBDV derivation process as described above. However, due to the reason that the improved BVSP process produces more accurate disparity vectors, the NBDV derivation results might also be improved as well (i.e., the accuracy of derived disparity vectors may be improved).

In a first example BVSP process of the disclosure, during the BVSP process, an MB-level NBDV derivation process and a sub-region level disparity vector refinement process are combined. Firstly, video decoder 30 may be configured to derive a disparity vector for each MB. Video decoder 30 may be configured to derive a disparity vector using the improved NBDV derivation process described above or with the NBDV process as described in U.S. patent application Ser. No. 14/189,177.

Next, video decoder 30 may be configured to refine the disparity vector for each 8×8 sub-region of the current MB or MB partition. Video decoder 30 may use the refined disparity vectors for motion compensation for each sub-region of the current MB or MB partition coded with BVSP mode. The refinement of disparity vector for each sub-region of the MB or MB partition depends on the depth view component of the reference view. In one example, for each sub-region, a corresponding depth block in a depth component of the reference view is identified by the disparity vector from the NBDV derivation process. The maximum value of the four corner pixels in the corresponding depth block is converted to the horizontal component of a refined disparity vector. The vertical component of the refined disparity vector is set to 0. Note, here the refined disparity vector is the same as the derived disparity vector for sub-regions coded with BVSP mode, as discussed above.

In a first aspect of the first BVSP example, the size of sub-region may be K×K, with K being different from 8, for example, 16×16, 4×4, 2×2 or 1×1. In a second aspect of the first BVSP example, video decoder 30 is configured to refine the disparity vector once for one MB partition, or refine the disparity vector for each 8×8 region within one MB partition, even when K is smaller than 8.

In a third aspect of the first BVSP example, video decoder 30 may be configured to select the depth value from one or more depth pixels of the reference block identified by the disparity vector (produced by the NBDV derivation process) in the depth view component of the reference view. In some examples, video decoder 30 may be configured to not select full depth pixels within or near the center of the identified depth block in the reference depth view (which is located by the derived disparity vector from the NBDV derivation process). Instead, in one example, video decoder 30 may be configured to select depth pixels located in the corner positions of the identified depth block.

In a fourth aspect of the first BVSP example, video decoder 30 may be configured to inherit, for the vertical component of the refined disparity vector, the vertical component of the disparity vector derived from the NBDV derivation process. In a fifth aspect of the first BVSP example, video decoder 30 may be configured to set the vertical component of the refined disparity vector to be equal to 0.

In a second example BVSP process of this disclosure, video decoder 30 is configured to store, for an MB partition coded using BVSP mode, the refined disparity vector of each sub-region as the motion vector for the MB partition after the current MB is coded. In one example, this process is performed in the case that the size of the MB sub-region is larger than or equal to 4×4. The stored disparity vectors may be used in the NBDV derivation process of this disclosure described above.

In a first aspect of the second BVSP example, when the defined size of a sub-region is 8×8 (i.e., when K is equal to 8), video decoder 30 may be configured to store the refined disparity vector as the motion vector of an MB partition only when the MB partition size is equal to 8×8. For other MB partitions, video decoder 30 is configured to store the derived disparity vector of the MB from the NBDV derivation process as a disparity motion vector after the current MB is coded.

In a second aspect of the second BVSP example, video decoder 30 may be further configured to replace the reference picture index by the index which indicates the inter-view reference picture.

In a third aspect of the second BVSP example, each of the above-described BVSP techniques may be applied directly once an MB partition coded with BVSP mode is coded. That is, for example, video decoder 30 need not wait until the whole MB is fully decoded.

In a third example BVSP process of this disclosure, video decoder 30 may be configured to allocate additional memory for MBs which include at least one MB partition which is coded using BVSP mode. In this case, the refined disparity vector of each sub-region used for motion compensation of the BVSP partition can be stored and does not need to be overwritten.

In a first aspect of the third BVSP example, video decoder 30 may be configured to allocate up to (16/K)*(16/K) additional motion vectors per MB for one MB partition to store the refined disparity vectors if the partition is coded using BVSP mode.

In a second aspect of the third BVSP example, in the NBDV derivation process, when one neighboring block is coded using BVSP mode, the refined disparity vector associated with the sub-region which contains this neighboring block will be used as a disparity vector for current MB.

Each of the above methods may also be applied to 3D-HEVC with the MBs replaced by coding units (CUs) and MB partitions replaced by prediction units (PUs).

1 Example Implementation

The next section of the disclosure will discuss example implementations. When configuring 3D-AVC in a way that texture-first coding order is enabled, the decoding process of BVSP may include the following steps. Alternatively, the method described in the section 1.2 below may be applied to other coding tools that require a disparity vector, for example, D-MVP in 3D-AVC.

Section 1.1 Example Indication of BVSP Mode

In one example, the indication that one or more MB partitions are coded using BVSP mode as used in previous proposals for 3D-AVC using depth-first coding order may be reused. In another example, one flag, instead of reference index, may be signaled in each MB partition to indicate whether BVSP or conventional inter-prediction (temporal prediction or inter-view prediction) is used.

Section 1.2 Example Disparity Vector Derivation Process

The NBDV derivation process is described in sub-section 1.2.1 and 1.2.2 below. The generation process of refined disparity vectors which are used for motion compensation for each sub-region in BVSP coded partitions is described in sub-section 1.2.3 below.

The process of deriving a disparity vector from the NBDV derivation process may be invoked before decoding one macroblock. In another example, furthermore, the process of refining the disparity vectors may be invoked for MB partitions coded with BVSP mode. In another example, the process of deriving a disparity vector from NBDV may be invoked when one MB partition is coded with BVSP mode and/or other inter modes.

In another example, the techniques of sub-section 1.2.1 and 1.2.3 below are performed in order, and then the refined disparity vectors of sub-regions generated from the techniques of sub-section 1.2.3 are used for motion compensation of BVSP coded MB partitions. Furthermore, the disparity vectors generated from the techniques of sub-section 1.2.1 below may be applied in D-MVP.

In another example, the techniques of sub-sections 1.2.1, 1.2.2 and 1.2.3 are invoked in order. The updated disparity vector generated from the techniques of section 1.2.2 below is then used for all MB partitions either coded with BVSP or other inter-modes. For MB partitions coded with BVSP mode, the updated disparity vector is then used to obtain the refined disparity vectors of sub-regions which are used for motion compensation of BVSP coded MB partitions.

Sub-Section 1.2.1 Disparity Vector Derived from an NBDV Derivation Process for One Macroblock without Depth Information As described in U.S. patent application Ser. No. 14/189,177, a MB-level NBDV derivation process may be applied without considering any depth information. Initially, video decoder 30 may be configured to select a certain number of temporal picture candidates, and several pre-defined temporal neighboring blocks are checked in the candidate picture, followed by pre-defined spatial neighboring blocks. For each neighboring block, if it is predicted either from a different view or a synthetic reference component in Ref-PicList0 (i.e., coded using BVSP mode), the disparity motion vector or the associated derived disparity vector/refined disparity vector of the neighboring block is returned as the disparity vector of the current MB if the horizontal component of the derived disparity vector/refined disparity vector is unequal to 0.

In another example, video decoder 30 may be configured to check both reference picture list 0 (RefPicList0) and reference picture list 1 (RefPicList1) in any order.

In another example, video decoder 30 may be configured to check all spatial (and/or) temporal neighboring blocks, whether or not they use inter-view prediction. If not, video decoder 30 checks whether neighboring blocks are coded using BVSP mode in a different round of checking the neighboring blocks.

In another example, vide decoder 30 is configured to first check whether neighboring blocks are coded using BVSP mode in first round of checking all neighboring blocks. If no blocks are coded using BVSP mode, video decoder 30 then checks all spatial (and/or) temporal neighboring blocks to determine if they are coded using inter-view prediction.

In another example, when one neighboring block is not coded with either inter-view prediction or BVSP mode, video decoder 30 returns the disparity vector of the MB that contains the neighboring block, if available, as the disparity vector. The disparity vector of the MB is available only when at least one of the MB partitions is coded using BVSP mode.

Sub-Section 1.2.1.1 Selection of Temporal/Spatial Neighboring Blocks

Similar methods as described in U.S. patent application Ser. No. 14/189,177, and above, may be used for selection which temporal/spatial neighboring blocks to use for the NBDV derivation. Note that a temporal neighboring block in a temporal picture can also be predicted with BVSP, and the disparity vector of the BVSP coded MB or MB partition is also considered as available.

Sub-Section 1.2.2 MB-Level Disparity Vector Update Process with Depth Information Video decoder 30 may be configured to update a disparity vector derived using the NBDV derivation processes described above using the following techniques. First, denote the size of an MB as K×K (wherein K could be 16), the top-left position of the current MB partition relative to current picture as (x, y), and the derived disparity vector from NBDV in sub-section 1.2.1 for the current MB as (DV[0], DV[1]), wherein DV[0] and DV[1] denote the horizontal and vertical component of the disparity vector. One depth value (D) is selected from four corner pixels in the reference depth view:

$$D=\max(D0,D1,D2,D3)$$

The function max(.) returns the maximum value of Di (i being 0 to 3) and Di denotes the i-th pixel value which is located at:

i=0: ((x+(DV[0]>>P))>>reduced_resolution_flag, (y+(DV[1]>>P))>>reduced_resolution_flag)

i=1: ((x+(DV[0]>>P)+K−1)>>reduced_resolution_flag, (y+(DV[1]>>P))>>reduced_resolution_flag)

i=2: ((x+(DV[0]>>P))>>reduced_resolution_flag, (y+(DV[1]>>P)+K−1)>>reduced_resolution_flag)

i=3: ((x+(DV[0]>>P)+K−1)>>reduced_resolution_flag, (y+(DV[1]>>P)+K−1)>>reduced_resolution_flag)

The syntax element reduced_resolution_flag equal to 1 specifies that the depth view components of a view component pair have a lower spatial resolution than the luma component of the texture view component of the same view component pair, and the width and height of the depth view components are both half of the width and height of all the texture view components. The syntax element reduced_resolution_flag equal to 0 specifies that when both depth view components and texture view components are present, they have the same spatial resolution. P denotes the precision of disparity vectors which is equal to 2 when the disparity vector is in quarter-pixel precision, 1 for half-pixel precision and 0 for integer-pixel precision.

In another example, max (D0, D3) may be used to select the depth value.

In another example, other pixels within the co-located MB in the reference depth view may be used.

Video decoder 30 may be then configured to convert the horizontal component of the updated disparity vector from the selected depth value for the sub-region within current MB region. The vertical component of the updated disparity vector is set to 0.

In another example, the vertical component of the updated disparity vector may be set to the vertical component of the derived disparity vector from NBDV.

In another example, K may be equal to 8, 4 or 2.

The updated disparity vector may be used for all partitions within current MB.

Section 1.2.3 Disparity Vector Refinement for Each MB Partition Coded with BVSP Mode Video decoder 30 may also be configured to derive one refined disparity vector for each sub-region of each MB partition, in the case that the MB partition is coded with BVSP mode (i.e., predicted from a synthetic reference component).

Video decoder 30 may be configured to refine a disparity vector derived using the NBDV derivation processes described above using the following techniques. First, denote the size of the sub-region as K×K (wherein K could be 8), the top-left position of one sub-region within current MB partition relative to current picture as (x, y), and the derived disparity vector from the NBDV derivation process (or the updated disparity vector generated after performing the techniques of sub-section 1.2.2) for current MB as (DV[0], DV[1]), wherein DV[0] and DV[1] denote the horizontal and vertical component of the disparity vector. One depth value (D) is selected from four corner pixels in the reference depth view:

$$D=\max(D0,D1,D2,D3)$$

The function max(•) returns the maximum value of Di (i being 0 to 3) and Di denotes the i-th pixel value which is located at:
i=0: ((x+(DV[0]>>P))>>reduced_resolution_flag, (y+(DV[1]>>P))>>reduced_resolution_flag)
i=1: ((x+(DV[0]>>P)+K−1)>>reduced_resolution_flag, (y+(DV[1]>>P))>>reduced_resolution_flag)
i=2: ((x+(DV[0]>>P))>>reduced_resolution_flag, (y+(DV[1]>>P)+K−1)>>reduced_resolution_flag)
i=3: ((x+(DV[0]>>P)+K−1)>>reduced_resolution_flag, (y+(DV[1]>>P)+K−1)>>reduced_resolution_flag)

For this sub-section, the syntax element reduced_resolution_flag and P is defined as in section 1.2.2.

In another example, max (D0, D3) may be used to select the depth value.

In another example, other pixels within the co-located MB in the reference depth view may be used.

Video decoder 30 may be further configured to convert the horizontal component of the refined disparity vector from the selected depth value for the sub-region within current MB region. The vertical component of the refined disparity vector is set to 0. In another example, the vertical component of the refined disparity vector may be set to the vertical component of the derived disparity vector from NBDV.

In another example, K may be equal to 4, 2 or 1.

Section 1.3 Prediction of One MB Partition Coded with BVSP Mode

For each sub-region within current MB partition coded with BVSP mode, video decoder 30 may be configured to use the refined disparity vector to obtain the prediction block in the reference texture view. In another example, for each MB partition coded with BVSP mode, video decoder 30 may be configured to use the derived disparity vector from the NBDV derivation process to obtain the prediction block in the reference texture view. The residual block of current MB partition and the prediction blocks together are used to reconstruct the MB partition.

1.4 Motion Vector Assignment for MB Partitions Coded with BVSP Mode

After one MB in non-base texture view is fully decoded, video decoder 30 may store the refined disparity vectors, as described in sub-section 1.2.3, are stored as the motion vectors for each sub-region of a MB partition which is coded using BVSP mode.

In another example, after one MB in non-base texture view is fully decoded, video decoder 30 may store the disparity vector derived from the NBDV derivation process as described in sub-section 1.2.1 or the updated disparity vector with depth information taken into consideration as described in sub-section 1.2.2 as the motion vector for all MB partitions which are coded using BVSP mode.

In another example, after one MB partition coded with BVSP mode in non-base texture view is decoded, video decoder 30 may directly store the derived disparity vector from MB-level NBDV derivation process as described sub-section 1.2.1 or the updated disparity vector with depth information taken into consideration as described in sub-section 1.2.2 as the motion vector for this MB partition.

In another example, after one MB partition coded with BVSP mode in non-base texture view is decoded, video decoder 30 may directly store the refined disparity vectors for each sub-region, as described in sub-section 1.2.3, as the motion vector for this sub-region.

In another example, instead of storing the derived disparity vector from the NBDV derivation process (with possible refinement), as described in sub-section 1.2.2, or storing the refined disparity vectors as the motion vectors for BVSP coded partitions, video decoder 30 may allocate additional memory to store this information.

In another example, video decoder 30 allocates one motion vector per MB to store the derived disparity vector from the NBDV derivation process (with possible refinement) as described in sub-section 1.2.2 if current MB has at least one partition coded with BVSP mode. During the NBDV derivation process, when one neighboring block uses BVSP mode, the disparity vector associated with the MB which contains this neighboring block will be used as a disparity vector for the current MB.

In another example, four motion vectors are allocated per MB to store the refined disparity vectors for each sub-region when the size of the sub-region is equal to 8×8. During the NBDV derivation process, when one neighboring block uses BVSP mode, video decoder 30 uses the disparity vector associated with the sub-region which contains this neighboring block as a disparity vector for the current MB.

Figure 6:
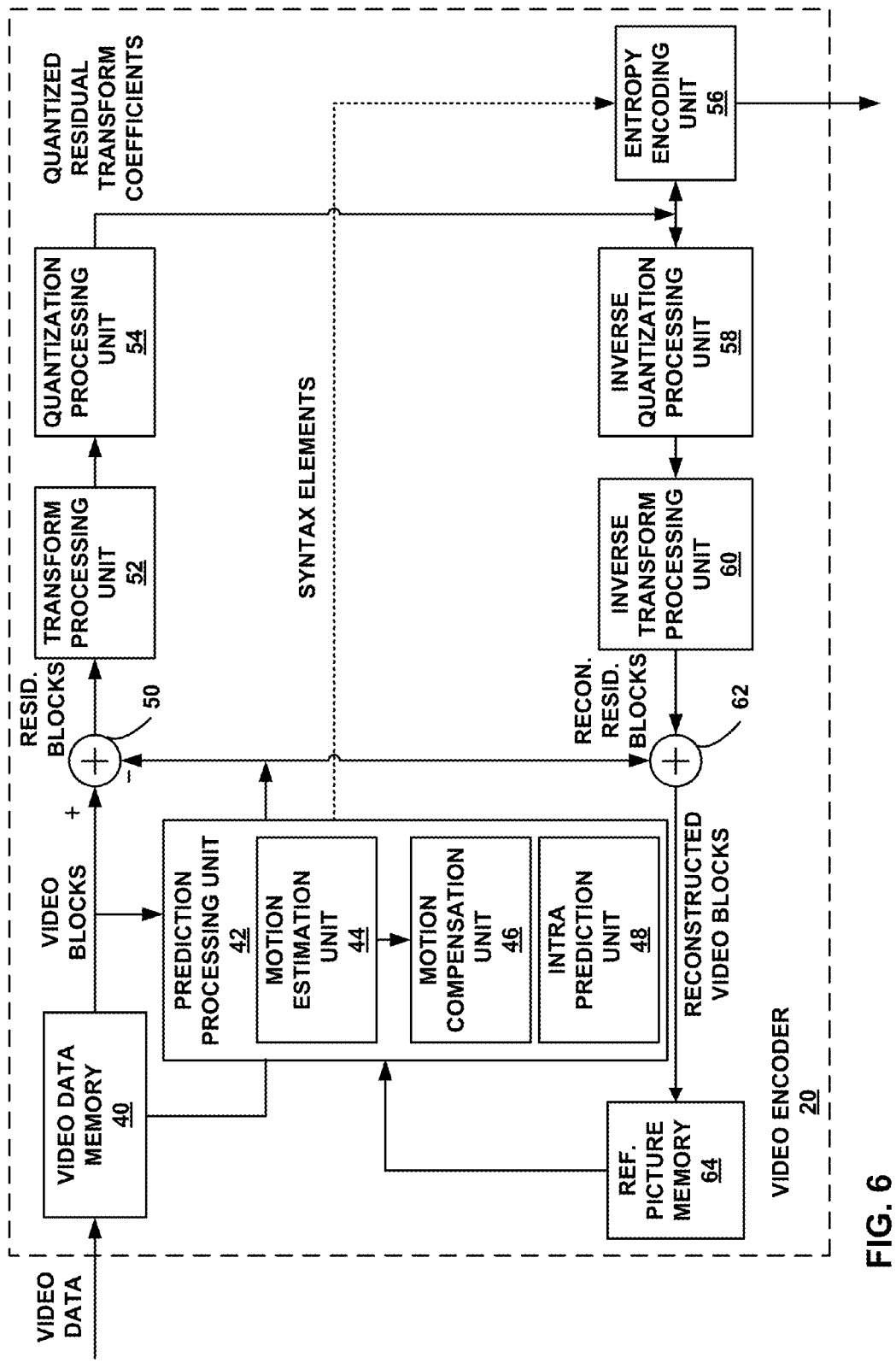
FIG. 6 is a block diagram illustrating an example video encoder that may implement the techniques described in this disclosure.

FIG. 6 is a block diagram illustrating an example of a video encoder that may implement the techniques described in this disclosure. For example, FIG. 6 illustrates video encoder 20 which may perform intra- and inter-coding of video blocks within video slices. For example, video encoder 20 may perform inter-prediction encoding or intra-prediction encoding. Intra-coding relies on spatial prediction to reduce or remove spatial redundancy in video within a given video frame or picture. Inter-coding relies on temporal prediction or inter-view prediction to reduce or remove temporal redundancy within adjacent frames or pictures of a video sequence or redundancy between pictures in different views. Intra-mode (I mode) may refer to any of several spatial based compression modes. Inter-modes, such as uni-directional prediction (P mode) or bi-prediction (B mode), may refer to any of several temporal-based compression modes.

In the example of FIG. 6, video encoder 20 includes video data memory 40, prediction processing unit 42, reference picture memory 64, summer 50, transform processing unit 52, quantization processing unit 54, and entropy encoding unit 56. Prediction processing unit 42 includes motion estimation unit 44, motion compensation unit 46, and intra prediction unit 48. For video block reconstruction, video encoder 20 also includes inverse quantization processing unit 58, inverse transform processing unit 60, and summer

62. A deblocking filter (not shown in FIG. 6) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. Reference picture memory 64 is one example of a decoding picture buffer (DPB that stores reference video data for use in encoding video data by video encoder 20 (e.g., in intra- or inter-coding modes, also referred to as intra- or inter-prediction coding modes). Video data memory 40 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and reference picture memory 64 may be provided by the same memory device or separate memory devices. In various examples, video data memory 40 may be on-chip with other components of video encoder 20, or off-chip relative to those components.

Video encoder 20 receives video data, and a partitioning unit (not shown) partitions the data into video blocks. This partitioning may also include partitioning into slices, tiles, or other larger units, as wells as video block partitioning (e.g., macroblock partitions and sub-blocks of partitions). Video encoder 20 generally illustrates the components that encode video blocks within a video slice to be encoded. The slice may be divided into multiple video blocks (and possibly into sets of video blocks referred to as tiles). Prediction processing unit 42 may select one of a plurality of possible coding modes, such as one of a plurality of intra coding modes (intra-prediction coding modes) or one of a plurality of inter coding modes (inter-prediction coding modes), for the current video block based on error results (e.g., coding rate and the level of distortion). Prediction processing unit 42 may provide the resulting intra- or inter-coded block to summer 50 to generate residual block data and to summer 62 to reconstruct the encoded block for use as a reference picture.

Intra prediction unit 48 within prediction processing unit 42 may perform intra-predictive coding of the current video block relative to one or more neighboring blocks in the same frame or slice as the current block to be coded to provide spatial compression. Motion estimation unit 44 and motion compensation unit 46 within prediction processing unit 42 perform inter-predictive coding of the current video block relative to one or more predictive blocks in one or more reference pictures to provide temporal compression.

Motion estimation unit 44 may be configured to determine the inter-prediction mode for a video slice according to a predetermined pattern for a video sequence. The predetermined pattern may designate video slices in the sequence as P slices or B slices. Motion estimation unit 44 and motion compensation unit 46 may be highly integrated, but are illustrated separately for conceptual purposes. Motion estimation, performed by motion estimation unit 44, is the process of generating motion vectors, which estimate motion for video blocks. A motion vector, for example, may indicate the displacement of a video block within a current video frame or picture relative to a predictive block within a reference picture.

A predictive block is a block that is found to closely match the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 44 may perform a motion search relative to the full pixel positions and fractional pixel positions and output a motion vector with fractional pixel precision.

Motion estimation unit 44 calculates a motion vector for a video block in an inter-coded (inter-prediction coded) slice by comparing the position of the video block to the position of a predictive block of a reference picture. The reference picture may be selected from a first reference picture list (RefPicList0) or a second reference picture list (RefPicList1), each of which identify one or more reference pictures stored in reference picture memory 64. Motion estimation unit 44 sends the calculated motion vector to entropy encoding unit 56 and motion compensation unit 46.

Motion compensation, performed by motion compensation unit 46, may involve fetching or generating the predictive block based on the motion vector determined by motion estimation, possibly performing interpolations to sub-pixel precision. Upon receiving the motion vector for the current video block, motion compensation unit 46 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 46 may also generate syntax elements associated with the video blocks and the video slice for use by video decoder 30 in decoding the video blocks of the video slice.

Intra-prediction unit 48 may intra-predict a current block, as an alternative to the inter-prediction performed by motion estimation unit 44 and motion compensation unit 46, as described above. In particular, intra-prediction unit 48 may determine an intra-prediction mode to use to encode a current block. In some examples, intra-prediction unit 48 may encode a current block using various intra-prediction modes, e.g., during separate encoding passes, and intra-prediction unit 48 (or a mode select unit, in some examples) may select an appropriate intra-prediction mode to use from the tested modes. For example, intra-prediction unit 48 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 48 may calculate ratios from the distortions and rates for the various encoded blocks to determine which intra-prediction mode exhibits the best rate-distortion value for the block.

In any case, after selecting an intra-prediction mode for a block, intra-prediction unit 48 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 42 generates the predictive block for the current video block via either inter-prediction or intra-prediction, video encoder 20 forms a residual video block by subtracting the predictive block from the current video block. The residual video data in the residual block may be applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization processing unit 58 and inverse transform processing unit 60 apply inverse quantization and inverse transformation, respectively, to reconstruct the residual block in the pixel domain for later use as a reference block of a reference picture. Motion compensation unit 46 may calculate a reference block by adding the residual block to a predictive block of one of the reference pictures within one of the reference picture lists. Motion compensation unit 46 may also apply one or more interpolation filters to the reconstructed residual block to calculate sub-integer pixel values for use in motion estimation. Summer 62 adds the reconstructed residual block to the motion compensated prediction block produced by motion compensation unit 46 to produce a reference block for storage in reference picture memory 64. The reference block may be used by motion estimation unit 44 and motion compensation unit 46 as a reference block to inter-predict a block in a subsequent video frame or picture.

In this manner, video encoder 20 is an example of a video encoder that is configured to implement one or more example techniques described in this disclosure. For example, video data memory 40 stores video data. The video data may include a texture video component of a dependent view and a depth view component that corresponds to the texture view component, each of which video encoder 20 is to encode in a 3D-AVC compliant video coding process.

In the techniques described in this disclosure, video encoder 20 may include one or more processors that are configured to encode, in a 3D-AVC compliant video coding process, a texture view component of a dependent view of the video data. As described above, each view in a 3D-AVC includes a texture view component and depth view component. There is one base view and one or more enhancement or dependent views in 3D-AVC, where texture view components of the one or more enhancement or dependent views may be inter-view predicted.

To encode the texture view component, video encoder 20 may be configured to evaluate motion information of one or more neighboring blocks of a current block in the texture view component to determine whether at least one neighboring block is inter-view predicted with a disparity motion vector that refers to an inter-view reference picture in a view other than the dependent view. Video encoder 20 may derive a disparity vector for the current block based on the disparity motion vector for one of the neighboring blocks. For texture-first coding, video encoder 20 may encode a depth view component, of the video data, that corresponds to the texture view component subsequent to encoding the texture view component.

In some examples, prediction processing unit 42 of video encoder 20 may be one example of a processor configured to implement the examples described in this disclosure for NBDV derivation and BVSP coding. In some examples, a unit (e.g., one or more processors) other than prediction processing unit 42 may implement the examples described above. In some examples, prediction processing unit 42 in conjunction with one or more other units of video encoder 20 may implement the examples described above. In some examples, a processor of video encoder 20 (not shown in FIG. 6) may, alone or in conjunction with other processors of video encoder 20, implement the examples described above.

Figure 7:
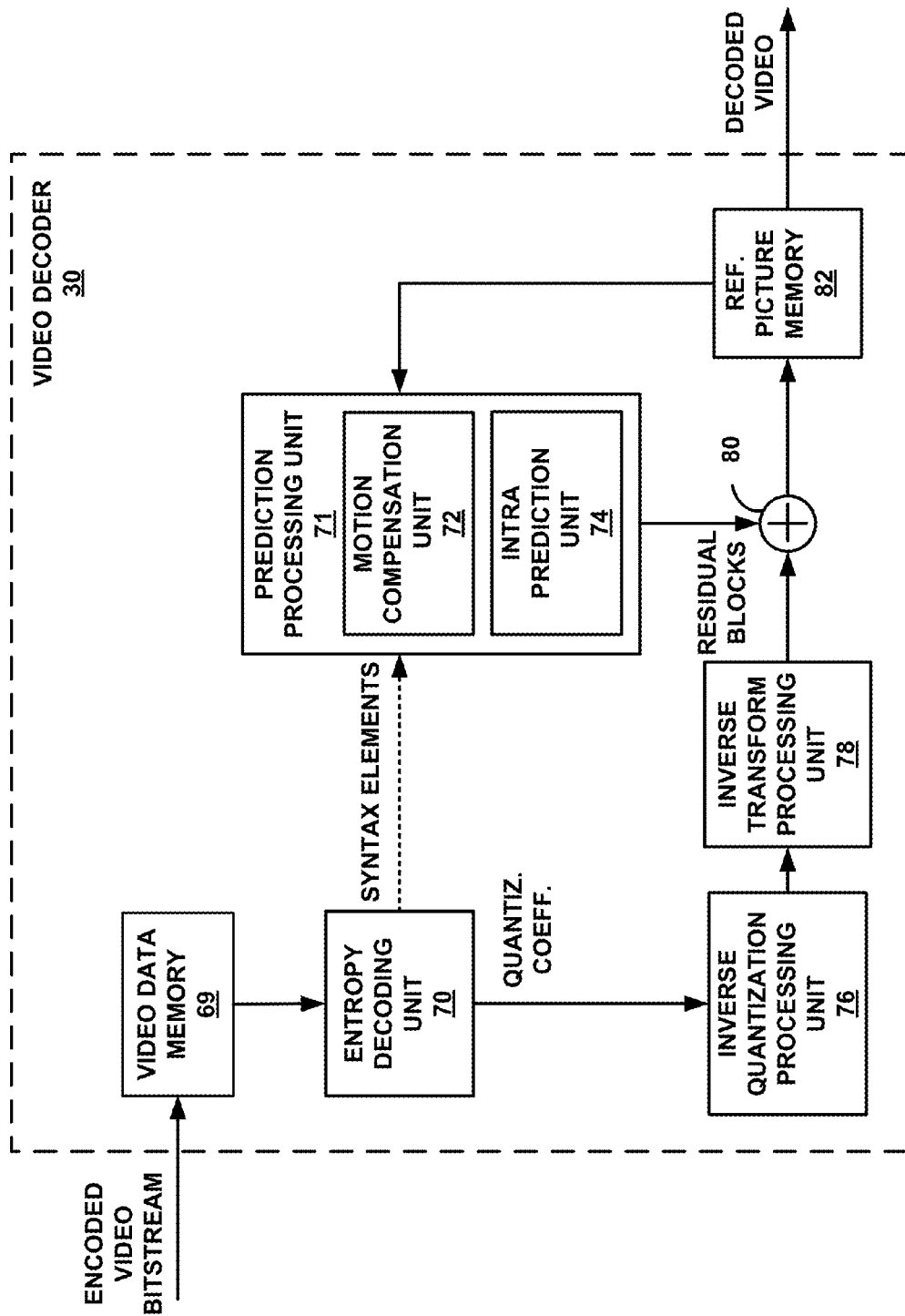
FIG. 7 is a block diagram illustrating an example video decoder that may implement the techniques described in this disclosure.

FIG. 7 is a block diagram illustrating an example of a video decoder that may implement the techniques described in this disclosure. For example, video decoder 30 may perform inter-prediction decoding or intra-prediction decoding. FIG. 7 illustrates video decoder 30. In the example of FIG. 7, video decoder 30 includes video data memory 69, entropy decoding unit 70, prediction processing unit 71, inverse quantization processing unit 76, inverse transform processing unit 78, summer 80, and reference picture memory 82. Prediction processing unit 71 includes motion compensation unit 72 and intra prediction unit 74. Video decoder 30 may, in some examples, perform a decoding pass generally reciprocal to the encoding pass described with respect to video encoder 20 from FIG. 6.

Video data memory 69 may store video data, such as an encoded video bitstream, to be decoded by the components of video decoder 30. The video data stored in video data memory 69 may be obtained, for example, from storage device 34, from a local video source, such as a camera, via wired or wireless network communication of video data, or by accessing physical data storage media. Video data memory 69 may form a coded picture buffer (CPB) that stores encoded video data from an encoded video bitstream.

Reference picture memory 82 is one example of a decoded picture buffer (DPB) that stores reference video data for use in decoding video data by video decoder 30 (e.g., in intra- or inter-coding modes). Video data memory 69 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and reference picture memory 82 may be provided by the same memory device or separate memory devices. In various examples, video data memory 69 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors, and other syntax elements. Entropy decoding unit 70 forwards the motion vectors and other syntax elements to prediction processing unit 71. Video decoder 30 may receive the syntax elements at the video slice level and/or the video block level.

When the video slice is coded as an intra-coded (I) slice, intra prediction unit 74 of prediction processing unit 71 may generate prediction data for a video block of the current video slice based on a signaled intra prediction mode and data from previously decoded blocks of the current frame or picture. When the video frame is coded as an inter-coded (i.e., B or P) slice, motion compensation unit 72 of prediction processing unit 71 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists (RefPicList0 and RefPicList1) using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization processing unit 76 inverse quantizes (i.e., de-quantizes), the quantized transform coefficients provided in the bitstream and decoded by entropy decoding unit 70. The inverse quantization process may include use of a quantization parameter calculated by video encoder 20 for each video block in the video slice to determine a degree of quantization and, likewise, a degree of inverse quantization that should be applied. Inverse transform processing unit 78 applies an inverse transform (e.g., an inverse DCT, an inverse integer transform, or a conceptually similar inverse transform process), to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 is an example of a video decoder that is configured to implement one or more example techniques described in this disclosure. For example, video data memory 69 stores video data. The video data may include information from which video decoder 30 can decode a texture video component of a dependent view and a depth view component that corresponds to the texture view component, each of which video encoder 20 is encoded in a 3D-AVC compliant video coding process.

In the techniques described in this disclosure, video decoder 30 may include one or more processors that are configured to decode, in a 3D-AVC compliant video coding process, a texture view component of a dependent view of the video data. To decode the texture view component, video decoder 30 may be configured to evaluate motion information of one or more neighboring blocks of a current block in the texture view component to determine whether at least one neighboring block is inter-view predicted with a disparity motion vector that refers to an inter-view reference picture in a view other than the dependent view. Video decoder 30 may derive a disparity vector for the current block based on the disparity motion vector for one of the neighboring blocks. For texture-first coding, video decoder 30 may decode a depth view component, of the video data, that corresponds to the texture view component subsequent to decoding the texture view component.

In some examples, prediction processing unit 71 of video decoder 30 may be one example of a processor configured to implement the examples described in this disclosure for NBDV derivation and BVSP coding. In some examples, a unit (e.g., one or more processors) other than prediction processing unit 71 may implement the examples described above. In some examples, prediction processing unit 71 in conjunction with one or more other units of video decoder 30 may implement the examples described above. In yet some other examples, a processor of video decoder 30 (not shown in FIG. 7) may, alone or in conjunction with other processors of video decoder 30, implement the examples described above.

Figure 9:
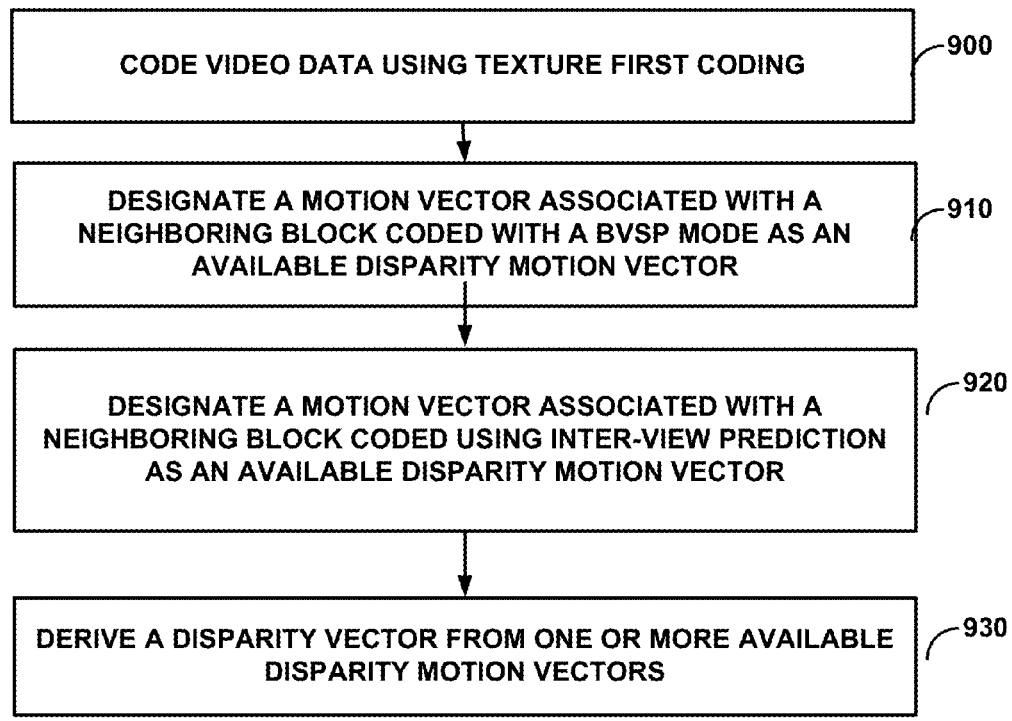
FIG. 9 is a flowchart illustrating an example method of the disclosure.

FIG. 9 is a flowchart illustrating an example method of the disclosure. The techniques described with reference to FIG. 9 may be performed by any structural or functional element of video encoder 20 and video decoder 30, including prediction processing unit 42 and prediction processing unit 71. The following examples will be described with reference to a "video coder," which as described above, is a generic term for either a video encoder of video decoder (e.g., video encoder 20 and video decoder 30).

As one example, a video coder may be configured to code video data using texture-first coding (900). In addition, the video coder may be configured to perform an NBDV derivation process for a block of the video data using a plurality of neighboring blocks, wherein the NBDV derivation process derives a disparity vector. The video decoder may be configured to perform the NBDV derivation process by designating a motion vector associated with a neighboring block of the plurality of neighboring blocks coded with a block-based view synthesis prediction (BVSP) mode as an available disparity motion vector of one or more available disparity motion vectors (910), and designating a motion vector associated with a neighboring block of the plurality of neighboring blocks coded using inter-view prediction mode as an available disparity motion vector of the one or more available disparity motion vectors (920). The video coder would the derive the disparity vector from the one or more available disparity motion vectors (930).

In another example of the disclosure, the video coder is configured to perform the NBDV derivation process by checking the plurality of neighboring blocks in an order, and deriving the disparity vector in the case that a particular neighboring block was coded in BVSP mode, or in the case that a particular neighboring block was coded using inter-view prediction.

In another example of the disclosure, the video coder is configured to perform the NBDV derivation process by checking the plurality of neighboring blocks to determine if any of the plurality of neighboring blocks is coded using inter-view prediction, deriving the disparity vector from the neighboring block coded using inter-view prediction in the case the one of the plurality of neighboring blocks is coded using inter-view prediction based on the checking, checking the plurality of neighboring blocks to determine if any of the plurality of neighboring blocks is coded using BVSP mode in the case that none of the plurality of neighboring blocks in coded using inter-view prediction, and deriving the disparity vector from the neighboring block coded using BVSP mode in the case that one of the plurality of neighboring blocks is coded using BVSP mode and none of the plurality of neighboring blocks is coded using inter-view prediction based on the checking.

In another example of the disclosure, the video coder is configured to perform the NBDV derivation process by checking the plurality of neighboring blocks to determine if any of the plurality of neighboring blocks is coded using BVSP mode, deriving the disparity vector from the neighboring block coded using BVSP mode in the case the one of the plurality of neighboring blocks is coded using BVSP mode based on the checking, checking the plurality of neighboring blocks to determine if any of the plurality of neighboring blocks is coded using inter-view prediction in the case that none of the plurality of neighboring blocks in coded using BVSP mode, and deriving the disparity vector from the neighboring block coded using inter-view prediction in the case that one of the plurality of neighboring blocks is coded using inter-view prediction and none of the plurality of neighboring blocks is coded using BVSP mode based on the checking.

In another example of the disclosure, the video coder is configured to perform the NBDV derivation process by selecting one depth value from a depth block in a depth reference view and converting the depth value to an updated disparity vector, and applying the updated disparity vector to the block of the video data.

In another example of the disclosure, the video coder is configured to store the updated disparity vector as a motion vector for the block of video data after the block of the video data is coded. In another example of the disclosure, the video coder is configured to allocate additional memory to store the derived disparity vector.

In another example of the disclosure, the block of the video data is a macroblock. In another example of the disclosure, the block of the video data is a sub-partition or partition of a macroblock. In another example of the disclosure, the block of the video data is a coding unit or a prediction unit.

In another example of the disclosure, the video coder is configured to code the block of the video data using BVSP mode and the derived disparity vector. In another example of the disclosure, the video coder is configured to code the block of the video data using depth-based motion vector prediction (D-MVP) and the derived disparity vector.

Figure 10:
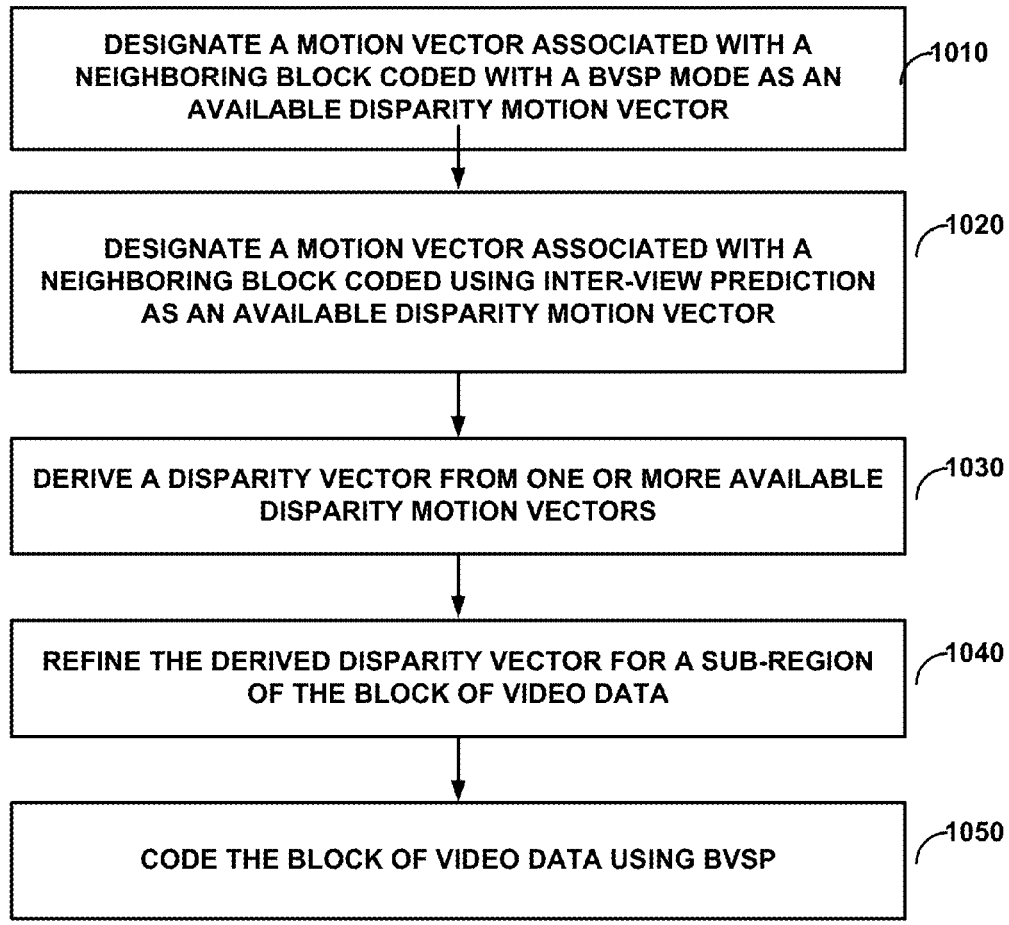
FIG. 10 is a flowchart illustrating another example method of the disclosure.

FIG. 10 is a flowchart illustrating another example method of the disclosure. The techniques described with reference to FIG. 10 may be performed by any structural or functional element of video encoder 20 and video decoder 30, including prediction processing unit 42 and prediction processing unit 71. The following examples will be described with reference to a "video coder," which as described above, is a generic term for either a video encoder of video decoder (e.g., video encoder 20 and video decoder 30).

In one example the video coder is configured to perform a BVSP process on a block of video data, the BVSP process comprising performing an NBDV derivation process to derive a disparity vector. In this regard, the video coder is configured to perform the NBDV derivation process by designating a motion vector associated with a neighboring block of the plurality of neighboring blocks coded with a block-based view synthesis prediction (BVSP) mode as an available disparity motion vector of one or more available disparity motion vector (1010), designating a motion vector associated with a neighboring block of the plurality of neighboring blocks coded using inter-view prediction mode as an available disparity motion vector of the one or more available disparity motion vectors (1020), an deriving the disparity vector from the one or more available disparity motion vectors (1030). The video coder is further configured to refine the derived disparity vector for a sub-region of the block of video data (1040), and code the block of video data using BVSP using the refined disparity vector (1050).

In another example of the disclosure, at least of the plurality of neighboring blocks is a spatial neighboring block within a current picture or a temporal neighboring block in a different picture.

In another example of the disclosure, the sub-region is an 8×8 sub-region. In another example of the disclosure, the sub-region is one of a 16×16, 4×4, 2×2, and 1×1 sub-region.

In another example of the disclosure, the video coder is further configured to select a depth value from one or more depth pixels of a reference block identified by a disparity vector produced by the NBDV derivation process for a sub-region of the block of video data, the one or more depth pixels being in a depth view component of the reference block, but not full pixels within a proximity to a center of a depth block in a reference depth view which is located by the disparity vector.

In another example of the disclosure, the video coder is further configured to inherit a vertical component of the refined disparity vector from a vertical component of a disparity vector produced by the NBDV derivation process. In another example of the disclosure, the video coder is further configured to set a vertical component of the refined disparity vector to be zero.

In another example of the disclosure, the video coder is further configured to store a refined disparity vector for each sub-region of the block of video data, wherein the stored refined disparity vector is used for the NBDV derivation process for another block. In another example of the disclosure, the video coder is further configured to store the refined disparity vector as a motion vector for the block of video data in the case that the block of video data is larger than some predetermined size and the stored refined disparity vector will be used in an NBDV derivation process.

In another example of the disclosure, the block of video data is a macroblock. In another example of the disclosure, the block of video data is a sub-partition or partition of a macroblock. In another example of the disclosure, the block of video data is a coding unit or a prediction unit.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
coding video data using texture-first coding; and
performing a neighboring block-based disparity vector (NBDV) derivation process for a block of the video data using a plurality of neighboring blocks to derive a disparity vector for the block of the video data by:
checking the plurality of neighboring blocks to determine whether any neighboring block of the plurality of neighboring blocks is coded using inter-view prediction or to determine whether any neighboring block of the plurality of neighboring blocks is coded using a block-based view synthesis prediction (BVSP) mode;
based on the checking, performing one of:
based on determining that a particular neighboring block of the plurality of neighboring blocks is coded using the BVSP mode, designating a motion vector associated with the particular neighboring block of the plurality of neighboring blocks coded with the BVSP mode as an available disparity motion vector of one or more available disparity motion vectors, or
based on determining that the particular neighboring block of the plurality of neighboring blocks is coded using the inter-view prediction, designating the motion vector associated with the particular neighboring block of the plurality of neighboring blocks coded using the inter-view prediction mode as the available disparity motion vector of the one or more available disparity motion vectors; and
deriving the disparity vector for the block of the video data based on the particular neighboring block being coded using the BVSP mode or based on the particular neighboring block being coded using the inter-view prediction mode.

2. The method of claim 1, wherein deriving the disparity vector for the block of the video data comprises:
deriving the disparity vector for the block of the video data from the one or more available disparity motion vectors.

3. The method of claim 1, wherein checking the plurality of neighboring blocks comprises:
checking the plurality of neighboring blocks to determine if any of the plurality of neighboring blocks is coded using the inter-view prediction; and
checking the plurality of neighboring blocks to determine if any of the plurality of neighboring blocks is coded using the BVSP mode only in the case that none of the plurality of neighboring blocks in coded using the inter-view prediction.

4. The method of claim 1, wherein checking the plurality of neighboring blocks comprises:
checking the plurality of neighboring blocks to determine if any of the plurality of neighboring blocks is coded using the BVSP mode; and
checking the plurality of neighboring blocks to determine if any of the plurality of neighboring blocks is coded using the inter-view prediction only in the case that none of the plurality of neighboring blocks in coded using the BVSP mode.

5. The method of claim 1, wherein performing the NBDV derivation process further comprises:
selecting one depth value from a depth block in a depth reference view;
converting the depth value to an updated disparity vector; and
applying the updated disparity vector to the block of the video data.

6. The method of claim 5, further comprising:
storing the updated disparity vector as a motion vector for the block of the video data after the block of the video data is coded.

7. The method of claim 1, further comprising:
allocating additional memory to store the derived disparity vector.

8. The method of claim 1, wherein the block of the video data is a macroblock.

9. The method of claim 1, wherein the block of the video data is a sub-partition or a partition of a macroblock.

10. The method of claim 1, wherein the block of the video data is a coding unit or a prediction unit.

11. The method of claim 1, further comprising:
coding the block of the video data using the BVSP mode and the derived disparity vector.

12. The method of claim 2, further comprising:
coding the block of the video data using depth-based motion vector prediction (D-MVP) and the derived disparity vector.

13. An apparatus configured to code video data, the apparatus comprising:
a memory configured to store a block of the video data; and
a video coder in communication with the memory, the video coder being configured to:
code video data using texture-first coding; and
perform a neighboring block-based disparity vector (NBDV) derivation process for the block of the video data using a plurality of neighboring blocks to derive a disparity vector for the block of the video data, wherein to perform the NBDV derivation process, the video coder is configured to:
check the plurality of neighboring blocks to determine whether any neighboring block of the plurality of neighboring blocks is coded using inter-view prediction or to determine whether any neighboring block of the plurality of neighboring blocks is coded using a block-based view synthesis prediction (BVSP) mode;
based on a determination, from the check of the plurality of neighboring blocks, that a particular neighboring block of the plurality of neighboring blocks is coded using the BVSP mode, designate a motion vector associated with the particular neighboring block of the plurality of neighboring blocks coded with the BVSP mode as an available disparity motion vector of one or more available disparity motion vectors;
based on a determination, from the check of the plurality of neighboring blocks, that the particular neighboring block of the plurality of neighboring blocks is coded using the inter-view prediction, designate a motion vector associated with the particular neighboring block of the plurality of neighboring blocks coded using the inter-view prediction mode as the available disparity motion vector of the one or more available disparity motion vectors; and
derive the disparity vector for the block of the video data based on the particular neighboring block being coded using the BVSP mode or based on the particular neighboring block being coded using the inter-view prediction mode.

14. The apparatus of claim 13, wherein to derive the disparity vector for the block of the video data, the video coder is further configured to:
derive the disparity vector for the block of the video data from the one or more available disparity motion vectors.

15. The apparatus of claim 13, wherein to check the plurality of neighboring blocks, the video coder is further configured to:
check the plurality of neighboring blocks to determine if any of the plurality of neighboring blocks is coded using the inter-view prediction; and
check the plurality of neighboring blocks to determine if any of the plurality of neighboring blocks is coded using the BVSP mode only in the case that none of the plurality of neighboring blocks in coded using the inter-view prediction.

16. The apparatus of claim 13, wherein to check the plurality of neighboring blocks, the video coder is further configured to:
check the plurality of neighboring blocks to determine if any of the plurality of neighboring blocks is coded using the BVSP mode; and
check the plurality of neighboring blocks to determine if any of the plurality of neighboring blocks is coded using the inter-view prediction only in the case that none of the plurality of neighboring blocks in coded using the BVSP mode.

17. The apparatus of claim 13, wherein the video coder is further configured to:
select one depth value from a depth block in a depth reference view and converting the depth value to an updated disparity vector;
convert the depth value to an updated disparity vector; and apply the updated disparity vector to the block of the video data.

18. The apparatus of claim 17, wherein the video coder is further configured to:
store, in the memory, the updated disparity vector as a motion vector for the block of the video data after the block of the video data is coded.

19. The apparatus of claim 13, wherein the video coder is further configured to:
allocate additional memory to store the derived disparity vector.

20. The apparatus of claim 13, wherein the block of the video data is a macroblock.

21. The apparatus of claim 13, wherein the block of the video data is a sub-partition or a partition of a macroblock.

22. The apparatus of claim 13, wherein the block of the video data is a coding unit or a prediction unit.

23. The apparatus of claim 13, wherein the video coder is further configured to:
code the block of the video data using BVSP mode and the derived disparity vector.

24. The apparatus of claim 14, wherein the video coder is further configured to:
code the block of the video data using depth-based motion vector prediction (D-MVP) and the derived disparity vector.

25. A non-transitory computer-readable storage medium storing instructions that, when executed, cause one or more processors configured to code video data to:
code video data using texture-first coding; and
perform a neighboring block-based disparity vector (NBDV) derivation process for the block of the video data using a plurality of neighboring blocks to derive a disparity vector for the block of the video data, the instructions that cause the one or more processors to perform the NBDV derivation process comprising instructions that, when executed, cause the one or more processors to:
check the plurality of neighboring blocks according to an order to determine whether any neighboring block of the plurality of neighboring blocks is coded using inter-view prediction or to determine whether any neighboring block of the plurality of neighboring blocks is coded using a block-based view synthesis prediction (BVSP) mode;
based on the check of the plurality of neighboring blocks, perform one of:
based on a determination that a particular neighboring block of the plurality of neighboring blocks is coded using the BVSP mode, designate a motion vector associated with the particular neighboring block of the plurality of neighboring blocks coded with the BVSP mode as an available disparity motion vector of one or more available disparity motion vectors;
based on a determination that the particular neighboring block of the plurality of neighboring blocks is coded using the inter-view prediction, designate a motion vector associated with the particular neighboring block of the plurality of neighboring blocks coded using the inter-view prediction mode as the available disparity motion vector of the one or more available disparity motion vectors; and
derive the disparity vector for the block of the video data based on the particular neighboring block being coded using the BVSP mode or based on the particular neighboring block being coded using the inter-view prediction mode.

26. The non-transitory computer-readable storage medium of claim 25, wherein the instructions that cause the one or more processors to derive the disparity vector for the block of the video data further cause the one or more processors to:
derive the disparity vector for the block of the video data from the one or more available disparity motion vectors.

27. The device of claim 13, further comprising at least one of:
one or more integrated circuits;
one or more microprocessors;
one or more digital signal processors (DSPs);
one or more field programmable gate arrays (FPGAs);
a desktop computer;
a laptop computer;
a tablet computer;
a phone;
a television;
a camera;
a display device;
a digital media player;
a video game console;
a video game device;
a video streaming device; or
a wireless communication device.

28. The device of claim 13, further comprising a camera configured to capture at least a portion of the video data.

29. The device of claim 13, further comprising a display configured to output at least a portion of the video data.

* * * * *